United States Patent
Aoki

(10) Patent No.: US 11,967,349 B2
(45) Date of Patent: Apr. 23, 2024

(54) MAGNETIC DISK DEVICE AND SSW METHOD

(71) Applicants: Kabushiki Kaisha Toshiba, Tokyo (JP); Toshiba Electronic Devices & Storage Corporation, Tokyo (JP)

(72) Inventor: Takahiro Aoki, Kawasaki Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/892,947

(22) Filed: Aug. 22, 2022

(65) Prior Publication Data

US 2023/0206949 A1 Jun. 29, 2023

(30) Foreign Application Priority Data

Dec. 24, 2021 (JP) ................. 2021-210904

(51) Int. Cl.
*G11B 5/54* (2006.01)
*G11B 5/02* (2006.01)
*G11B 5/596* (2006.01)

(52) U.S. Cl.
CPC ............ *G11B 5/59638* (2013.01); *G11B 5/02* (2013.01); *G11B 5/59627* (2013.01)

(58) Field of Classification Search
CPC ..... G11B 5/553; G11B 5/5569; G11B 5/5526; G11B 5/5534; G11B 5/5539; G11B 5/5543; G11B 5/5547; G11B 5/54; G11B 2001/0021

USPC ......................................................... 360/75
See application file for complete search history.

(56) References Cited

U.S. PATENT DOCUMENTS

| | | | |
|---|---|---|---|
| 5,668,679 A | 9/1997 | Swearingen et al. | |
| 6,600,620 B1 | 7/2003 | Krounbi et al. | |
| 7,248,427 B1 * | 7/2007 | Everett | G11B 5/59638 360/75 |
| 7,505,223 B1 * | 3/2009 | McCornack | G11B 5/59644 360/75 |
| 7,567,404 B1 | 7/2009 | Rutherford et al. | |
| 8,743,504 B1 | 6/2014 | Bryant et al. | |
| 8,786,978 B2 | 7/2014 | Akiya | |
| 9,947,356 B1 | 4/2018 | Oswald et al. | |
| 10,867,629 B1 * | 12/2020 | Kiyonaga | G11B 5/5569 |
| 2016/0358621 A1 | 12/2016 | French, Jr. | |

* cited by examiner

*Primary Examiner* — Nabil Z Hindi
(74) *Attorney, Agent, or Firm* — Maier & Maier, PLLC

(57) ABSTRACT

According to one embodiment, a magnetic disk device comprises a disk, a first head, a second head, a controller. The disk includes a first surface and a second surface different from the first surface. The first head carries out read and write of data from and to the first surface. The second head carries out read and write of data from and to the second surface. The controller adjusts a spiral speed of at least one of the first head and the second head according to a cylinder offset amount corresponding to a positional difference between the first head and the second head. The spiral speed is a speed at which spiral servo patterns are to be written.

6 Claims, 12 Drawing Sheets

F.I.G. 1

| Head number | Reference surface | Spiral copy surface |
|---|---|---|
| 15-(2m-4) | | Spiral copy on the basis of reference head 15-(2n) |
| 15-(2m-3) | | Spiral copy on the basis of reference head 15-(2n) |
| 15-(2m-2) | | Spiral copy on the basis of reference head 15-(2n) |
| 15-(2m-1) | | Spiral copy on the basis of reference head 15-(2n) |
| 15-(2m) | Reference head 15-(2m) | |
| 15-(2m+1) | | Spiral copy on the basis of reference head 15-(2n) |
| 15-(2m+2) | | Spiral copy on the basis of reference head 15-(2n) |
| 15-(2m+3) | | Spiral copy on the basis of reference head 15-(2n) |
| 15-(2m+4) | | Spiral copy on the basis of reference head 15-(2n) |
| 15-(2n-4) | | Spiral copy on the basis of reference head 15-(2n) |
| 15-(2n-3) | | Spiral copy on the basis of reference head 15-(2n) |
| 15-(2n-2) | | Spiral copy on the basis of reference head 15-(2n) |
| 15-(2n-1) | | Spiral copy on the basis of reference head 15-(2n) |
| 15-(2n) | Reference head 15-(2n) | |
| 15-(2n+1) | | Spiral copy on the basis of reference head 15-(2n) |
| 15-(2n+2) | | Spiral copy on the basis of reference head 15-(2n) |
| 15-(2n+3) | | Spiral copy on the basis of reference head 15-(2n) |
| 15-(2n+4) | | Spiral copy on the basis of reference head 15-(2n) |

F I G. 6

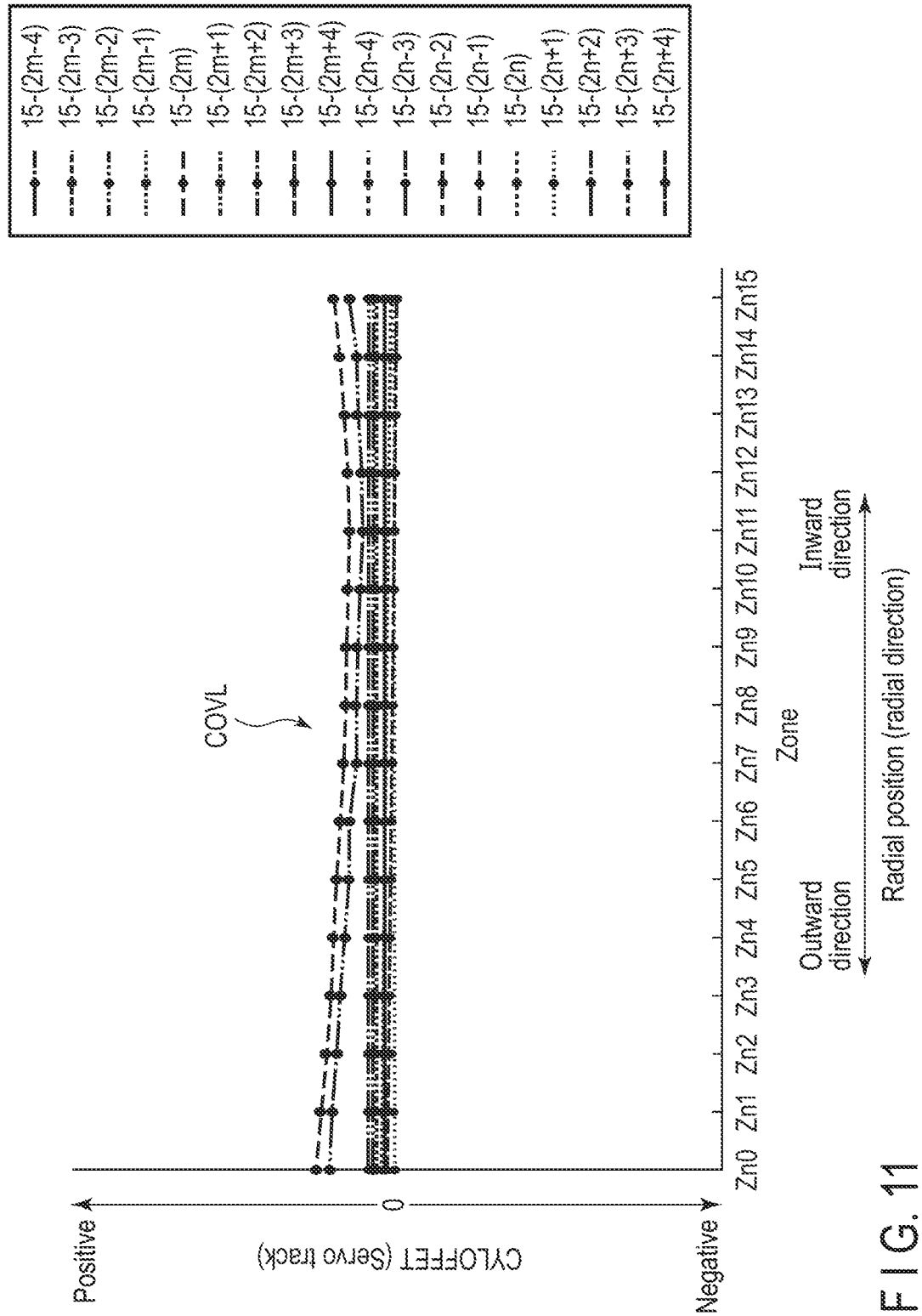
F I G. 11

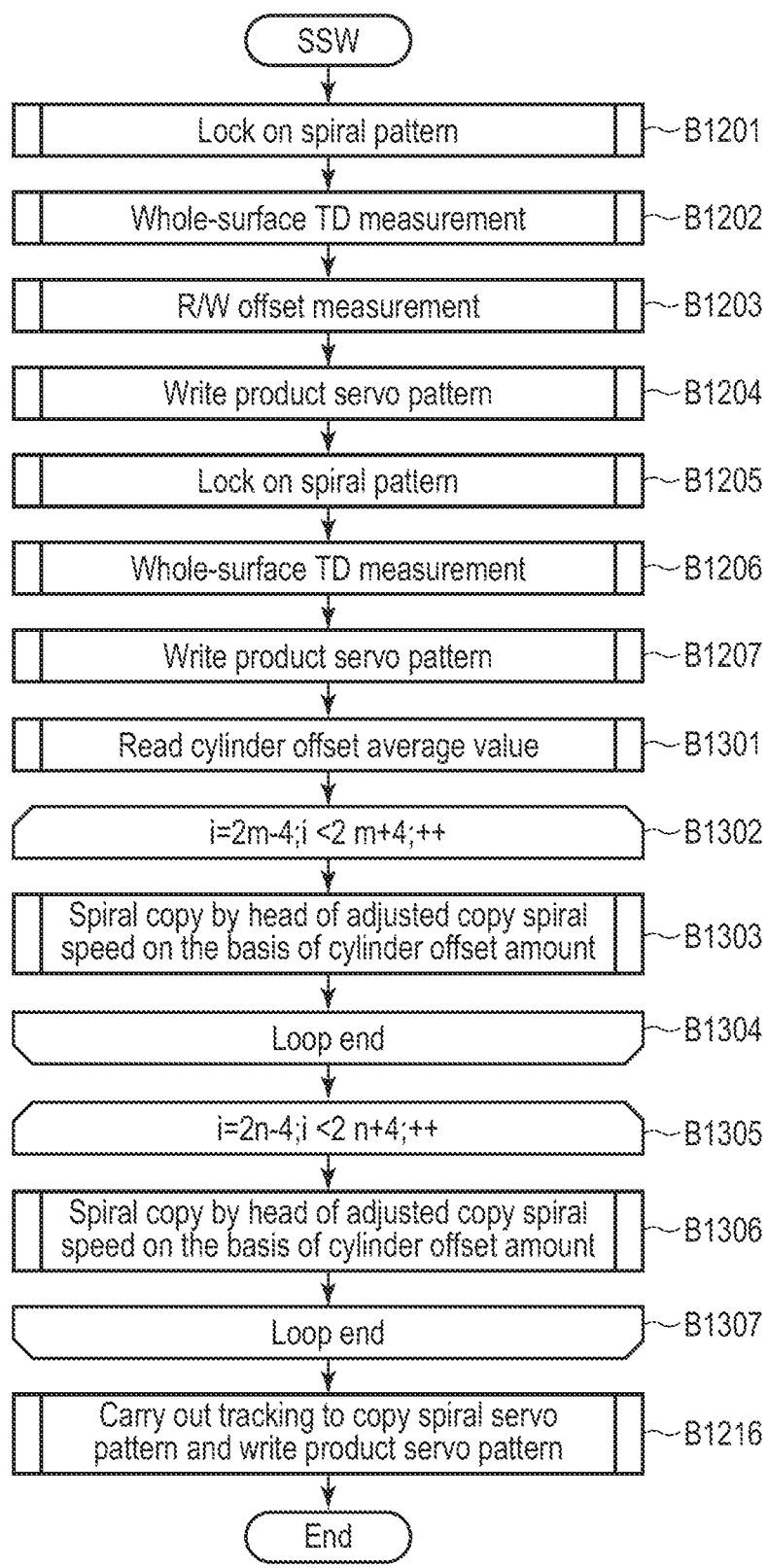
F I G. 13

MAGNETIC DISK DEVICE AND SSW METHOD

CROSS-REFERENCE TO RELATED APPLICATIONS

This application is based upon and claims the benefit of priority from Japanese Patent Application No. 2021-210904, filed Dec. 24, 2021, the entire contents of which are incorporated herein by reference.

FIELD

Embodiments described herein relate generally to a magnetic disk device and SSW method.

BACKGROUND

In a magnetic disk device, in the process of blank disk writing (BDW) for writing spiral servo patterns, a plurality of spiral servo patterns (hereinafter referred to as reference spiral servo patterns in some cases) are written on one surface (hereinafter referred to as a reference surface in some cases) of a disk on which absolutely no data or pattern is written by a head (hereinafter referred to as a reference head in some cases) corresponding to this reference surface. In a magnetic disk device, a plurality of servo patterns (hereinafter referred to as product servo patterns in some cases) to be used in the end product are written on the reference surface by the reference head on the basis of the reference spiral servo patterns. In the magnetic disk device, in the process of self servo write (SSW), a plurality of spiral servo patterns (hereinafter referred to as copy spiral servo patterns in some cases) are written or copied on or to a surface (hereinafter referred to as another surface in some cases) different from the reference surface by a head (hereinafter referred to as another head in some cases) different from the reference head on the basis of the reference spiral servo patterns written on the reference surface by the reference head. When the reference head and another head are to be positioned to the same radial position of the disk, e.g., the cylinder, there is a possibility of the reference head and another head not being positioned to the same radial position, e.g., the cylinder due to a structural error or the like. In other words, there is a possibility that the reference head and another head are not opposed to each other with the disk interposed between them and are shifted from each other in the radial direction of the disk. A positional difference can occur between the reference spiral servo pattern and copy spiral servo pattern due to the positional shift or error (hereinafter referred to as a cylinder offset in some cases) between the reference head and another head.

An embodiment described herein aims to provide a magnetic disk device and SSW method capable of enhancing the reliability.

BRIEF DESCRIPTION OF THE DRAWINGS

FIG. 6 is a schematic view showing an example of a correspondence relationship between each reference head and spiral copy heads.
FIG. 11 is a schematic view showing an example of changes in the cylinder offset amount relative to the radial positions compared with a predetermined head according to the embodiment.
FIG. 13 is a schematic view showing an example of SSW processing according to a modified example 1.

DETAILED DESCRIPTION

In general, according to one embodiment, a magnetic disk device comprises a disk, a first head, a second head, a controller. The disk includes a first surface and a second surface different from the first surface. The first head carries out read and write of data from and to the first surface. The second head carries out read and write of data from and to the second surface. The controller adjusts a spiral speed of at least one of the first head and the second head according to a cylinder offset amount corresponding to a positional difference between the first head and the second head. The spiral speed is a speed at which spiral servo patterns are to be written.

Hereinafter an embodiment will be described with reference to the accompanying drawings. It should be noted that the drawings are only examples and are not intended to limit the scope of the invention.

Embodiment

Figure 1:
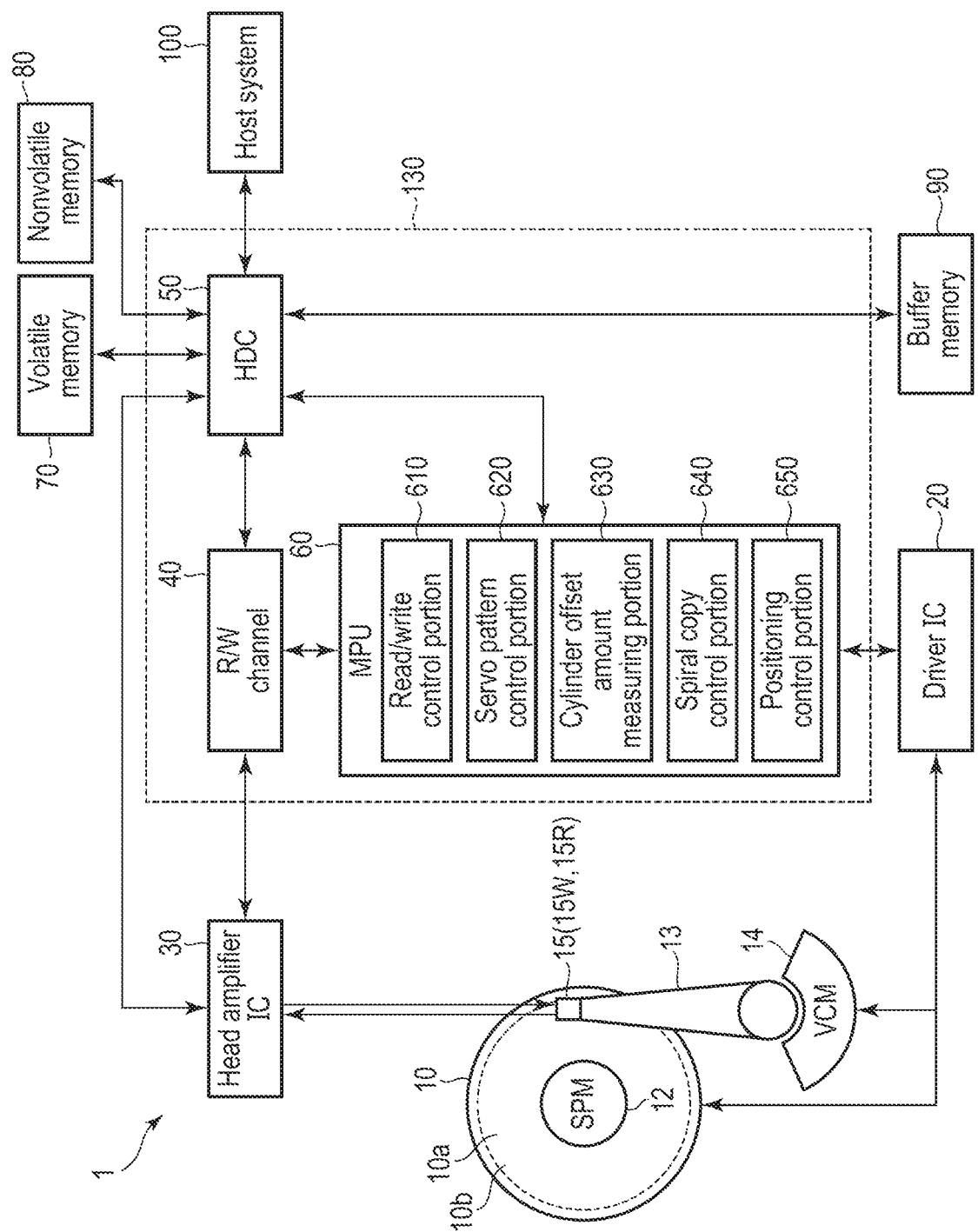
FIG. 1 is a block diagram showing the configuration of a magnetic disk device according to an embodiment.

FIG. 1 is a block diagram showing the configuration of a magnetic disk device 1 according to an embodiment. The magnetic disk device 1 includes a head disk assembly (HDA) to be described later, driver IC 20, head amplifier integrated circuit (hereinafter referred to as a head amplifier IC or preamplifier) 30, volatile memory 70, nonvolatile memory 80, buffer memory (buffer) 90, and system controller 130 which is a one-chip integrated circuit. Further, the magnetic disk device 1 is connected to a host system (hereinafter referred to simply as a host) 100.

The HDA includes magnetic disks (hereinafter referred to as disks) 10, spindle motor (hereinafter referred to as an SPM) 12, arms 13 on which heads 15 are mounted, and voice coil motor (hereinafter referred to as a VCM) 14. The disks 10 are attached to the SPM 12 and is rotated by the drive of the SPM 12. The arm 13 and VCM 14 constitute an actuator. The actuator controls movement of the head 15 mounted on the arm 13 to a predetermined position on the disk 10. The disks 10 and heads 15 are provided in plural numbers. It should be note that each of the disk 10 and head 15 may be provided in a number of only one.

In the disk 10, a user data area 10*a* usable by the user and system area 10*b* to which information necessary for system management is written are allocated to an area thereof to which data is writable. It should be noted that a media cache (referred to as a media cache area in some cases) in which data (or a command) transferred from the host 100 or the like is temporarily saved or recorded before being written to a predetermined area of the user data area 10*a* may be allocated to the disk 10 as an area separate from the user data area 10*a* and system area 10*b*. Hereinafter the direction from the inner circumference of the disk 10 to the outer circumference thereof or direction from the outer circumference of the disk 10 to the inner circumference thereof is referred to as the radial direction. In the radial direction, the direction from the inner circumference to the outer circumference is referred to as the outward direction (outside) and direction from the outer circumference to the inner circumference is referred as the inward direction (inside). The direction intersecting, e.g., orthogonal to the radial direction of the disk 10 is referred to as the circumferential direction. The circumferential direction corresponds to the direction along the circumference of the disk 10. Further, a predetermined position of the disk 10 in the radial direction thereof is referred to as a radial position and predetermined position of the disk 10 in the circumferential direction thereof is referred to as a circumferential position in some cases. The radial position and circumferential position are collectively referred to simply as positions in some cases. The disk 10 is divided into a plurality of areas (hereinafter referred to as zones or zone areas in some cases) in units of predetermined ranges in the radial direction. In a zone, a plurality of tracks is included. A track includes therein a plurality of sectors. It should be noted that the term "track" is used in various senses, i.e., in the senses such as "one of a plurality of areas formed by dividing the disk 10 into a plurality of areas in units of predetermined ranges in the radial direction", "data written to one of a plurality of areas formed by dividing the disk 10 into a plurality of areas in units of predetermined ranges in the radial direction", "an area extending in the circumferential direction of the disk 10 at a predetermined radial position thereof", "data written to an area extending in the circumferential direction of the disk 10 at a predetermined radial position thereof", "an area of the disk 10 corresponding to one circumference at a predetermined radial position thereof", "data corresponding to one circumference written to an area of the disk 10 corresponding to one circumference at a predetermined radial position thereof", "a pathway of the head 15 to be positioned to a predetermined radial position of the disk 10 and made to carry out write", "data written by the head 15 positioned to a predetermined radial position of the disk 10", "data written to a predetermined track of the disk 10", and so on. The term "sector" is used in various senses, i.e., in the senses such as "one of a plurality of areas formed by dividing a predetermined track of the disk 10 into a plurality of areas in the circumferential direction", "data written to one of a plurality of areas formed by dividing a predetermined track of the disk 10 into a plurality of areas in the circumferential direction", "an area at a predetermined circumferential position and at a predetermined radial position of the disk 10", "data written to an area at a predetermined circumferential position and at a predetermined radial position of the disk 10", "data written to a predetermined sector of the disk 10", and so on. A "width of a track in the radial direction" is referred to as a "track width" in some cases. A center position of a track width is referred to as a track center in some cases. The track center is referred to simply as a track in some cases.

The head 15 is opposed to the disk 10. For example, to one surface of the disk 10, one head 15 is opposed. The head 15 includes a slider as a main body thereof and further includes a write head 15W and read head 15R each implemented in the slider. The write head 15W writes data to the disk 10. The read head 15R reads data written to the disk 10. It should be noted that the "write head 15W" is referred to simply as the "head 15" in some cases, "read head 15R" is referred to simply as the "head 15" in some cases, and "write head 15W and read head 15R" are collectively called the "heads 15" in some cases. The "central part of the head 15" is referred to as the "head 15", "central part of the write head 15W" is referred to as the "write head 15W", and "central part of the read head 15R" is referred to as the "read head 15R" in some cases. The "central part of the write head 15W" is referred to simply as the "head 15" in some cases and "central part of the read head 15R" is referred to simply as the "head 15" in some cases. The expression "positioning the central part of the head 15 to a track center of a predetermined track" is rephrased by "positioning the head 15 to a predetermined track", "arranging the head 15 at a predetermined track", "making the head 15 positioned at a predetermined track" or the like in some cases.

Figure 2:
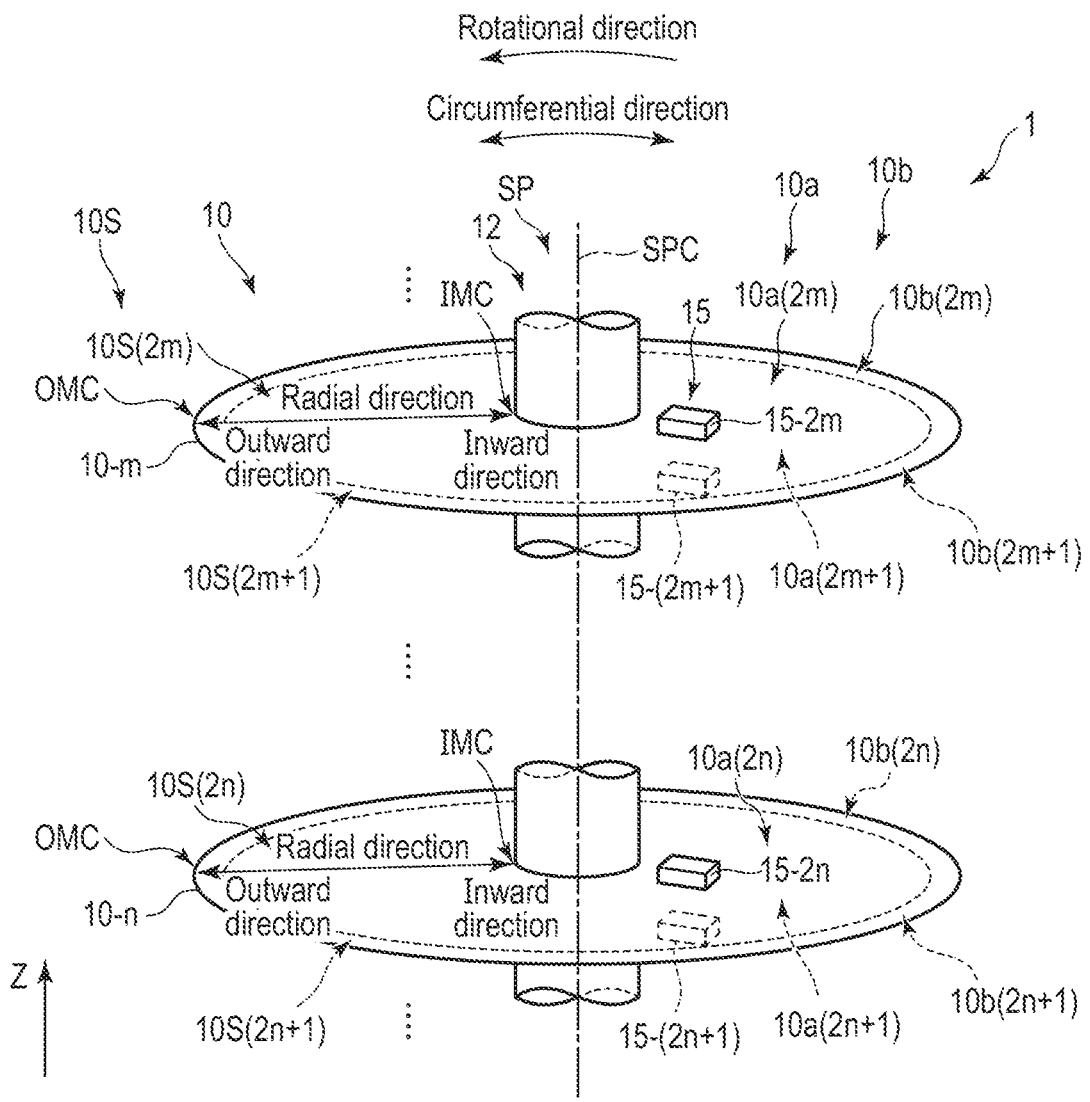
FIG. 2 is a schematic view showing an example of arrangement of heads relative to the disks according to the embodiment.

FIG. 2 is a schematic view showing an example of arrangement of the heads 15 relative to the disks 10 according to the embodiment. In FIG. 2, the innermost circumference IMC and outermost circumference OMC of the disk 10 are shown. As shown in FIG. 2, in the circumferential direction, the direction in which the disk 10 is rotated is referred to as the rotational direction. It should be noted that although in the example shown in FIG. 2, the rotational direction is indicated as the counterclockwise rotation, the rotational direction may be the opposite direction (clockwise). The height direction Z is the direction parallel to the direction in which the spindle SP of the SPM 12 extends. In other words, the height direction Z is the direction in which the plurality of disks 10 are stacked on top of each other. Further, the height direction Z corresponds to the direction from the bottom wall of the magnetic disk device 1 to the cover opposed to the bottom wall. In the height direction Z, the direction from the disk 10-*n* to the disk 10-*m* is referred to as the upper side (upward direction) (or simply as the top) and direction from the disk 10-*m* to the disk 10-*n* is referred to as the lower side (downward direction) (or simply as the bottom) in some cases. Further, it is assumed that a position of observation from which the magnetic disk device 1 is observed is provided on the tip end side of the arrow indicating the height direction z, and viewing the surface of the disk 10 from the position of observation is referred to as a planar view in some cases.

In the example shown in FIG. 2, the SPM 12 includes a spindle SP. The spindle SP extends in the height direction Z. The spindle SP is rotatable around the central axis SPC.

The disk 10 includes the plurality of disks 10. In the example shown in FIG. 2, the disk 10 includes the disks 10-*m*, 10-*n*, . . . . Here, conditions m≥0 and n>m (n≥0) are given. It should be noted that the disk 10 may include three disks or more and may include only one disk. The disk 10 is attached to the spindle SP. The disk 10 includes surfaces 10S (10S(2*m*), 10S(2*m*+1), 10S(2*n*), 10S(2*n*+1), . . . ). The surfaces 10S (10S(2*m*), 10S(2*m*+1), 10S(2*n*), 10S(2*n*+1), . . . ) spread in parallel with the plane spreading in the direction orthogonal to the height direction Z. It should be noted that the surfaces 10S (10S(2*m*), 10S(2*m*+1), 10S(2$n$), 10S(2$n$+1), . . . ) may spread in parallel with the plane inclined relatively to the plane spreading in the direction orthogonal to the height direction Z. The disk 10-$m$ includes the top surface 10S(2$m$) and back surface 10S(2$m$+1) on the opposite side of the top surface 10S(2$m$). The top surface 10S(2$m$) is a surface upwardly directed in the height direction Z. The back surface 10S(2$m$+1) is a surface downwardly directed in the height direction Z. The back surface 10S(2$m$+1) is positioned on the underside of the top surface 10S(2$m$). The disk 10-$n$ includes the top surface 10S(2$n$) and back surface 10S(2$n$+1) on the opposite side of the top surface 10S(2$n$). The top surface 10S(2$n$) is a surface upwardly directed in the height direction Z. The back surface 10S(2$n$+1) is a surface downwardly directed in the height direction Z. The back surface 10S(2$n$+1) is positioned on the underside of the top surface 10S(2$n$). The disk 10-$n$ is provided beneath the disk 10-$m$ in the height direction Z. In other words, the disk 10-$n$ is positioned beneath the disk 10-$m$ in the height direction Z. In the planar view, the disks 10-$m$ and 10-$n$ are coincident with each other. The top surface 10S(2$m$) includes a user data area 10$a$(2$m$) and system area 10$b$(2$m$). The back surface 10S(2$m$+1) includes the user data area 10$a$(2$m$+1) and system area 10$b$(2$m$+1). The top surface 10S(2$n$) includes the user data area 10$a$(2$n$) and system area 10$b$(2$n$). The back surface 10S(2$n$+1) includes the user data area 10$a$(2$n$+1) and system area 10$b$(2$n$+1).

The head 15 includes a plurality of heads 15. In the example shown in FIG. 2, the head 15 includes the head 15-2$m$, head 15-(2$m$+1), head 15-2$n$, head 15-(2$n$+1), and . . . . It should be noted that the head 15 may include five heads 15 or more, or may include three heads 15 or less. In the example shown in FIG. 2, the plurality of heads 15 are provided on the same actuator. It should be noted that the plurality of heads 15 may not be provided on the same actuator. The head 15 is opposed to the surface 10S. Each of the plurality of heads 15 is opposed to each of the surfaces 10S of the plurality of disks 10. In the example shown in FIG. 2, the head 15-2$m$ is opposed to the top surface 10S(2$m$). The head 15-2$m$ writes data on the top surface 10S(2$m$) and reads data from the top surface 10S(2$m$). The head 15-(2$m$+1) is opposed to the back surface 10S(2$m$+1). The head 15-(2$m$+1) writes data on the back surface 10S(2$m$+1) and reads data from the back surface 10S(2$m$+1). The head 15-2$n$ is opposed to the top surface 10S(2$n$). The head 15-2$n$ writes data on the top surface 10S(2$n$) and reads data from the top surface 10S(2$n$). The head 15-(2$n$+1) is opposed to the back surface 10S(2$n$+1). The head 15-(2$n$+1) writes data on the back surface 10S(2$n$+1) and reads data from the back surface 10S(2$n$+1).

Figure 3:
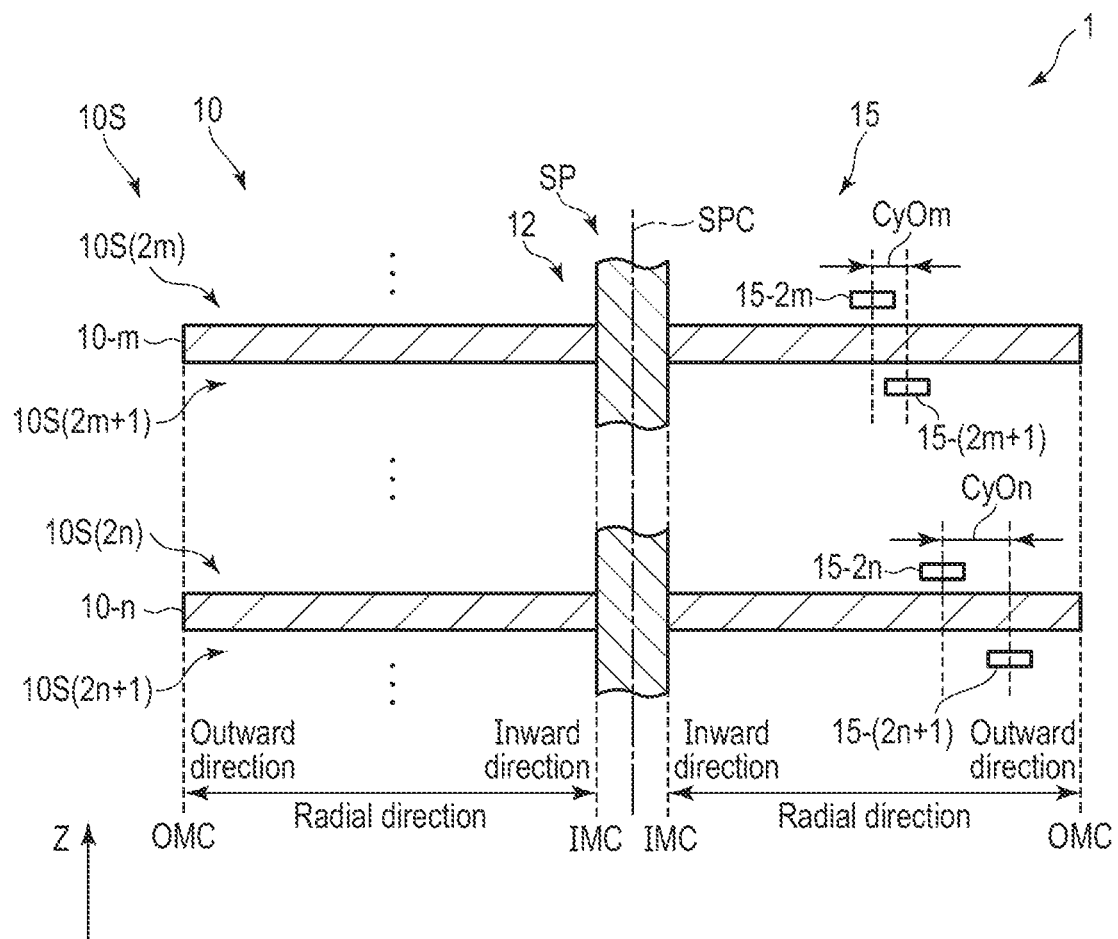
FIG. 3 is a cross-sectional view schematically showing a configuration example of a plurality of disks and a plurality of heads according to the embodiment.

FIG. 3 is a cross-sectional view schematically showing a configuration example of a plurality of disks 10 and a plurality of heads 15 according to the embodiment. FIG. 3 corresponds to FIG. 2.

In the example shown in FIG. 3, when positioned to a predetermined radial position, the head 15-2$m$ and head 15-(2$m$+1) are shifted from each other in the radial direction by an error CyOm. In other words, when positioned to a predetermined cylinder, the head 15-2$m$ and head 15-(2$m$+1) are shifted from each other in the radial direction by an error CyOm. That is, the head 15-2$m$ and head 15-(2$m$+1) are not opposed to each other with the disk 10-$m$ interposed between them.

When positioned to a predetermined radial position, the head 15-2$m$, head 15-2$n$, and head 15-(2$n$+1) are shifted from each other in the radial direction. In other words, when positioned to a predetermined cylinder, the head 15-2$m$, head 15-2$n$, and head 15-(2$n$+1) are shifted from each other in the radial direction. That is, the head 15-2$m$, head 15-2$n$, and head 15-(2$n$+1) are not opposed to each other with the plurality of disks 10 interposed between them.

Further, when positioned to a predetermined radial position, the head 15-(2$m$+1), head 15-2$n$, and head 15-(2$n$+1) are shifted from each other in the radial direction. In other words, when positioned to a predetermined cylinder, the head 15-(2$m$+1), head 15-2$n$, and head 15-(2$n$+1) are shifted from each other in the radial direction. That is, the head 15-(2$m$+1), head 15-2$n$, and head 15-(2$n$+1) are not opposed to each other with a plurality of disks 10 interposed between them.

In the example shown in FIG. 3, when positioned to a predetermined radial position, the head 15-2$n$ and head 15-(2$n$+1) are shifted from each other in the radial direction by an error CyOn. In other words, when positioned to a predetermined cylinder, the head 15-2$n$ and head 15-(2$n$+1) are shifted from each other in the radial direction by an error CyOn. That is, the head 15-2$n$ and head 15-(2$n$+1) are not opposed to each other with the disk 10-$n$ interposed between them.

When positioned to a predetermined radial position, the head 15-2$n$, head 15-2$m$, and head 15-(2$m$+1) are shifted from each other in the radial direction. In other words, when positioned to a predetermined cylinder, the head 15-2$n$, head 15-2$m$, and head 15-(2$m$+1) are shifted from each other in the radial direction. That is, the head 15-2$n$, head 15-2$m$, and head 15-(2$m$+1) are not opposed to each other with a plurality of disks 10 interposed between them.

Further, when positioned to a predetermined radial position, the head 15-(2$n$+1), head 15-2$m$, and head 15-(2$m$+1) are shifted from each other in the radial direction. In other words, when positioned to a predetermined cylinder, the head 15-(2$n$+1), head 15-2$m$, and head 15-(2$m$+1) are shifted from each other in the radial direction. That is, the head 15-(2$n$+1), Head 15-2$m$, and head 15-(2$m$+1) are not opposed to each other with a plurality of disks 10 interposed between them.

As shown in FIG. 3, a relative positional difference or error between a plurality of data items written by positioning a plurality of heads 15 to the same radial position, e.g., the same cylinder (track), such as two data items of a plurality of tracks or in a plurality of sectors, namely a relative positional difference or error between two tracks or two sectors in the radial direction is referred to as a cylinder offset or cylinder offset amount in some cases. Further, a relative positional difference or error between two heads among a plurality of heads 15 of case where the plurality of heads 15 are positioned to the same radial position is referred to as a cylinder offset or cylinder offset amount in some cases.

Figure 4:
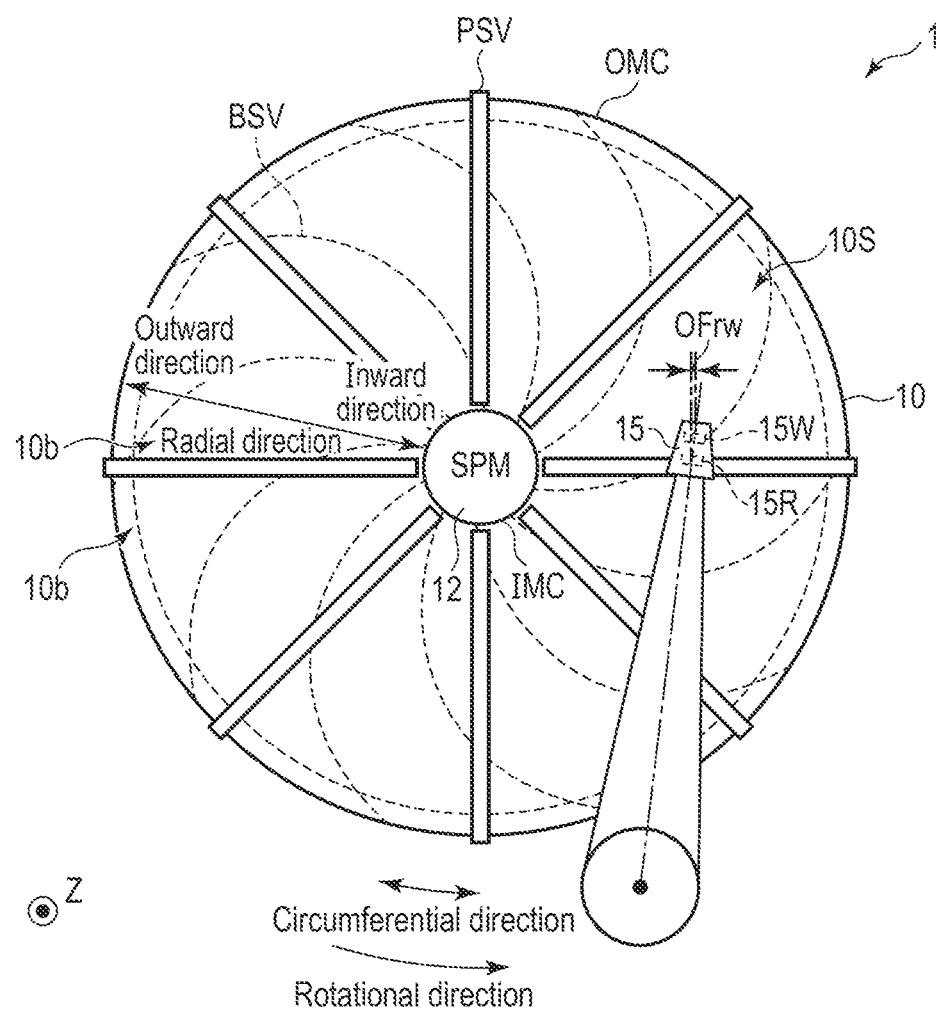
FIG. 4 is a plan view schematically showing an example of servo patterns according to the embodiment.

FIG. 4 is a plan view schematically showing an example of servo patterns according to the embodiment. In FIG. 4, an amount of a positional difference (hereinafter referred to as a read/write (R/W) offset amount in some cases) OFrw in the radial direction between the write head 15W and read head 15R in the head 15 obliquely positioned by a predetermined skew angle is shown.

The surface 10S of the disk 10 includes a plurality of servo patterns (hereinafter referred to as product servo patterns in some cases) to be used in the end product or a plurality of servo areas (hereinafter referred to as product servo areas in some cases) PSV, and a plurality of spiral servo patterns (a plurality of coarse guide spiral (CGS) servo patterns, a plurality of final spiral (FS) servo patterns, a plurality of fine guide spiral (FGS) servo patterns, and a plurality of final spiral (FS) servo patterns) BSV different from the plurality of product servo patterns.

In FIG. 4, the plurality of spiral servo patterns BSV are extended in spiral forms on the surface 10S of the disk 10 for convenience sake. It should be noted that although the plurality of spiral servo patterns BSV are described in such a manner as to extend in parallel with each other on the surface 10S of the disk 10, the patters may not actually extend in parallel with each other. The plurality of spiral servo patterns BSV are discretely arranged in the circumferential direction at predetermined intervals. Hereinafter the "spiral servo pattern BSV on a predetermined track" is referred to as the "spiral servo sector" in some cases. It should be noted that the "spiral servo pattern BSV" is referred to as the "spiral servo sector" in some cases. The "spiral servo sector" is referred to as the "spiral servo pattern" in some cases. The "spiral servo sector" includes the corresponding "servo data". It should be noted that the "spiral servo data written to the spiral servo sector" is referred to as the "spiral servo sector" or "spiral servo pattern" in some cases. Further, the "servo data" is referred to as the "servo sector" or "servo pattern" in some cases.

In FIG. 4, the plurality of product servo patterns PSV are linearly extended in the radial direction for convenience sake. It should be noted that although the plurality of product servo patterns PSV are described in such a manner as to linearly extend from the inner side toward the outer side in the radial direction, the product servo patterns PSV may be curved. For example, the product servo patterns PSV may extend in spiral forms on the surface 10S of the disk 10. The plurality of product servo patterns PSV are discretely arranged in the circumferential direction of the disk 10 at predetermined intervals so as to radially extend in the radial direction. Hereinafter the "product servo pattern PSV on a predetermined track" is referred to as the "product servo sector" in some cases. It should be noted that the "product servo pattern PSV" is referred to as the "product servo sector" in some cases. The "product servo sector" is referred to as the "product servo pattern" in some cases. The "product servo sector" includes the "servo data". It should be noted that the "product servo data written to the product servo sector" is referred to as the "product servo sector" in some cases. Further, the "data other than the product servo data written to the user data area 10a other than the product servo sector" is referred to as the "user data" in some cases.

The servo sector (or servo data) includes, for example, a preamble, servo mark, Gray code, PAD, burst data, and post code. It should be noted that the servo sector (or servo data) may not include the post code. The servo sector (or servo data) may be configured to include at least one data item of the preamble, servo mark, Gray code, PAD, burst data, and post code.

Further, the servo sector (or servo data) may be constituted of data items other than the preamble, servo mark, Gray code, PAD, burst data, and post code. In the servo sector, the preamble, servo mark, Gray code, PAD, burst data, and post code are continuously arranged from the front to the back in the circumferential direction in the order mentioned. The preamble includes preamble information for synchronization with the reproduced signal of the servo pattern constituted of the servo mark, Gray code, and the like. The servo mark includes servo mark information indicating the start of the servo pattern. The Gray code is constituted of an address (cylinder address) of a predetermined track and address of a servo sector of a predetermined track. The burst data is data (relative position data) to be used to detect a positional difference (positional error) of the head 15 relative to the track center of the predetermined track in the radial direction and/or the circumferential direction, and is constituted of a repetitive pattern of a predetermined period. The PAD includes PAD information of a synchronization signal such as the gap, servo AGC, and the like. The burst data is written in such a pattern that the phase of the burst data is reversed by 180° with one servo track period in the radial direction of the disk 10. The servo track (servo cylinder) corresponds to a track which is made an object of write processing or read processing by a command from the host or the like. The burst data is used to acquire, for example, a position (hereinafter referred to as a head position in some cases) of the head 15 on the disk 10 in the radial direction and/or the circumferential direction thereof. The burst data includes, for example, N burst and Q burst. The N burst and Q burst are written in such a data pattern that the N burst and Q burst are out of phase with each other by a phase shift angle of 90° in the radial direction of the disk 10. The post code includes data (hereinafter referred to as RRO correction data in some cases) or the like for correcting an error of the head 15 arranged concentric with the disk 10 relative to the path (hereinafter referred to as the target path in some cases) targeted by the head 15, the error resulting from, for example, deformation of the track relative to the track center occurring due to wobbling (repetitive run-out: RRO) of the disk 10 synchronized with the rotation of the disk 10 at the time when servo data is written to the disk. Hereinafter, for convenience of explanation, an error resulting from deformation of the track relative to the target path occurring due to the RRO is referred to simply as the RRO in some cases.

The driver IC 20 is connected to the system controller 130 (more specifically, MPU 60 to be described later), SPM 12, and VCM 14 and controls drive of the SPM 12 and VCM 14 according to the control of the system controller 130 (more specifically, MPU 60 to be described later).

The head amplifier IC 30 may include one head amplifier IC 30 and may include a plurality of head amplifier ICs 30. The head amplifier IC (preamplifier) 30 includes a read amplifier and write driver both of which are not shown. The read amplifier amplifies a read signal read from the disk 10 and outputs the amplified read signal to the system controller 130 (more specifically, read/write (R/W) channel 40). The write driver outputs a write current corresponding to a signal output from the R/W channel 40 to the head 15. The head amplifier IC 30 is electrically connected to the head 15 and the like.

Figure 5:
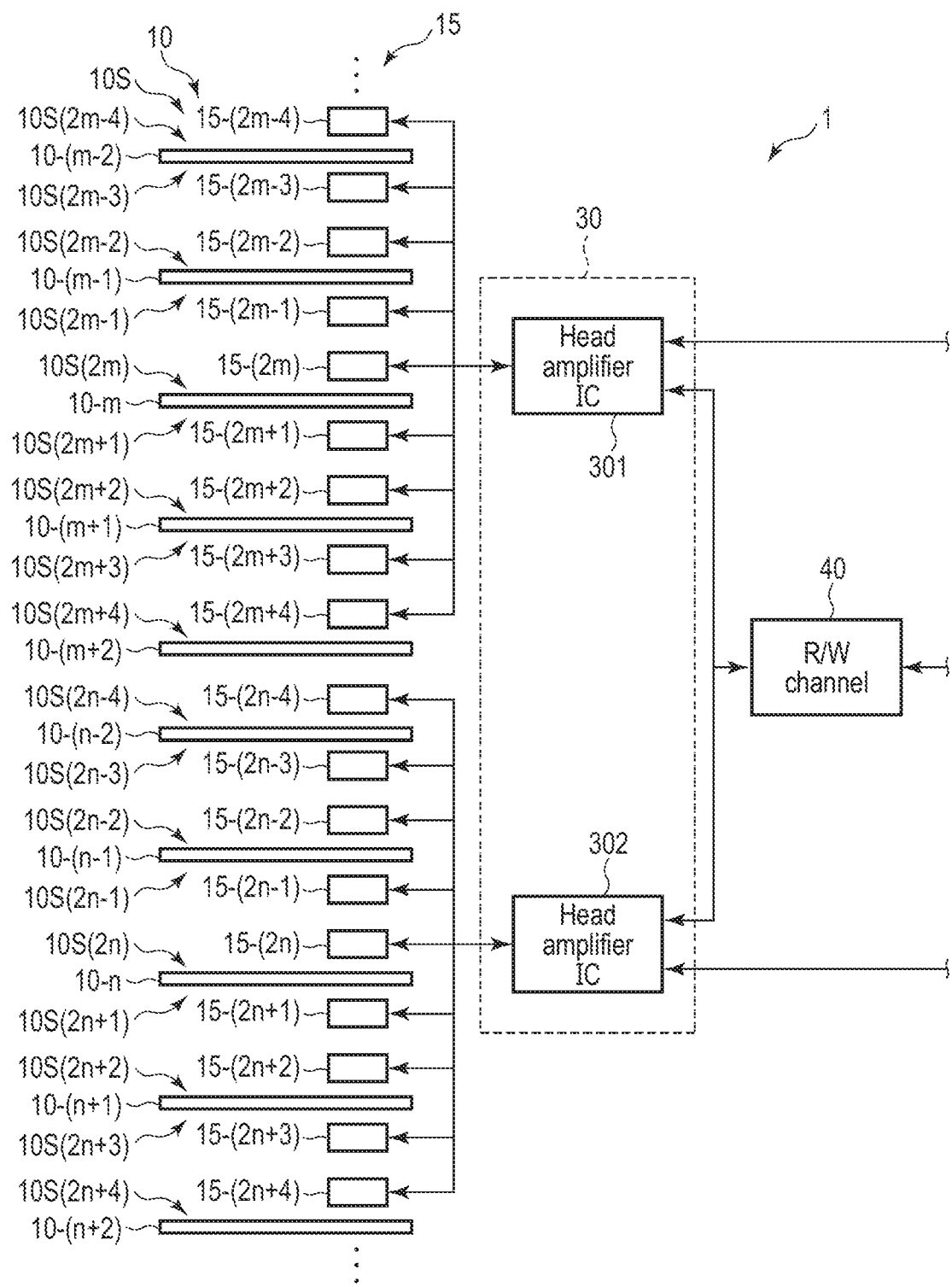
FIG. 5 is a schematic view showing an example of a head amplifier IC according to the embodiment.

FIG. 5 is a schematic view showing an example of the head amplifier IC 30 according to the embodiment. In FIG. 5, the head amplifier IC 30 includes head amplifier ICs 301 and 302. In FIG. 5, the disk 10 includes disks 10-($m$−2), 10-($m$−1), 10-$m$, 10-($m$+1), 10-($m$+2), 10-($n$−2), 10-($n$−1), 10-$n$, 10-($n$+1), and 10-($n$+2), . . . . It should be noted that the disk 10 may include eleven disks 10 or more and may include nine disks 10 or less. The disk 10-($m$−2) includes a top surface 10S($2m$−4) and back surface 10S($2m$−3) on the opposite side of the top surface 10S($2m$−4). The back surface ($2m$−3) is positioned on the underside of the top surface 10S($2m$−4). The disk 10-($m$−1) includes a top surface 10S($2m$−2) and back surface 10S($2m$−1) on the opposite side of the top surface 10S($2m$−2). The back surface 10S($2m$−1) is positioned on the underside of the top surface 10S($2m$−2). The disk 10-$m$ includes a top surface 10S($2m$) and back surface 10S($2m$+1) on the opposite side of the top surface 10S($2m$). The back surface 10S($2m$+1) is positioned on the underside of the top surface 10S($2m$). The disk 10-($m$+1) includes a top surface 10S($2m$+2) and back surface 10S(2m+3) on the opposite side of the top surface 10S(2m+2). The back surface 10S(2m+3) is positioned on the underside of the top surface 10S(2m+2). The disk 10-(m+2) includes a top surface 10S(2m+4). The top surface 10S(2m+4) is an upwardly directed surface. The disk 10-(n−2) includes a top surface 10S(2n−4) and back surface 10S(2n−3) on the opposite side of the top surface 10S(2n−4). The back surface 10S(2n−3) is positioned on the underside of the top surface 10S(2n−4). The disk 10-(n−1) includes a top surface 10S(2n−2) and back surface 10S(2n−1) on the opposite side of the top surface 10S(2n−2). The back surface 10S(2n−1) is positioned on the underside of the top surface 10S(2n−2). The disk 10-n includes a top surface 10S(2n) and back surface 10S(2n+1) on the opposite side of the top surface 10S(2n). The back surface 10S(2n+1) is positioned on the underside of the top surface 10S(2n). The disk 10-(n+1) includes a top surface 10S(2n+2) and back surface 10S(2n+3) on the opposite side of the top surface 10S(2n+2). The back surface 10S(2n+3) is positioned on the underside of the top surface 10S(2n+2). The disk 10-(n+2) includes a top surface 10S(2n+4). The top surface 10S(2n+4) is an upwardly directed surface.

In FIG. 5, the head 15 includes heads 15-(2m−4), 15-(2m−3), 15-(2m−2), 15-(2m−1), 15-(2m), 15-(2m+1), 15-(2m+2), 15-(2m+3), 15-(2m+4), 15-(2n−4), 15-(2n−3), 15-(2n−2), 15-(2n−1), 15-(2n), 15-(2n+1), 15-(2n+2), 15-(2n+3), and 15-(2n+4), . . . . It should be noted that the head 15 may include eleven heads 15 or more and may include nine heads 15 or less. In FIG. 5, the plurality of heads 15 (15-(2m−4) to 15-(2m+4), and 15-(2n−4) to 15-(2n+4)) are provided on the same actuator. It should be noted that the plurality of heads 15 (15-(2m−4) to 15-(2m+4), and 15-(2n−4) to 15-(2n+4)) may not be provided on the same actuator. In the example shown in FIG. 5, the head 15-(2m−4) is opposed to the surface 10S(2m−4). The head 15-(2m−4) writes data on the surface 10S(2m−4) and reads data from the surface 10S(2m−4). The head 15-(2m−3) is opposed to the surface 10S(2m−3). The head 15-(2m−3) writes data on the surface 10S(2m−3) and reads data from the surface 10S(2m−3). The head 15-(2m−2) is opposed to the surface 10S(2m−2). The head 15-(2m−2) writes data on the surface 10S(2m−2) and reads data from the surface 10S(2m−2). The head 15-(2m−1) is opposed to the surface 10S(2m−1). The head 15-(2m−1) writes data on the surface 10S(2m−1) and reads data from the surface 10S(2m−1). The head 15-(2m) is opposed to the surface 10S(2m). The head 15-(2m) writes data on the surface 10S(2m) and reads data from the surface 10S(2m). The head 15-(2m+1) is opposed to the surface 10S(2m+1). The head 15-(2m+1) writes data on the surface 10S(2m+1) and reads data from the surface 10S(2m+1). The head 15-(2m+2) is opposed to the surface 10S(2m+2). The head 15-(2m+2) writes data on the surface 10S(2m+2) and reads data from the surface 10S(2m+2). The head 15-(2m+3) is opposed to the surface 10S(2m+3). The head 15-(2m+3) writes data on the surface 10S(2m+3) and reads data from the surface 10S(2m+3). The head 15-(2m+4) is opposed to the surface 10S(2m+4). The head 15-(2m+4) writes data on the surface 10S(2m+4) and reads data from the surface 10S(2m+4). The head 15-(2n−4) is opposed to the surface 10S(2n−4). The head 15-(2n−4) writes data on the surface 10S(2n−4) and reads data from the surface 10S(2n−4). The head 15-(2n−3) is opposed to the surface 10S(2n−3). The head 15-(2n−3) writes data on the surface 10S(2n−3) and reads data from the surface 10S(2n−3). The head 15-(2n−2) is opposed to the surface 10S(2n−2). The head 15-(2n−2) writes data on the surface 10S(2n−2) and reads data from the surface 10S(2n−2). The head 15-(2n−1) is opposed to the surface 10S(2n−1). The head 15-(2n−1) writes data on the surface 10S(2n−1) and reads data from the surface 10S(2n−1). The head 15-(2n) is opposed to the surface 10S(2n). The head 15-(2n) writes data on the surface 10S(2n) and reads data from the surface 10S(2n). The head 15-(2n+1) is opposed to the surface 10S(2n+1). The head 15-(2n+1) writes data on the surface 10S(2n+1) and reads data from the surface 10S(2n+1). The head 15-(2n+2) is opposed to the surface 10S(2n+2). The head 15-(2n+2) writes data on the surface 10S(2n+2) and reads data from the surface 10S(2n+2). The head 15-(2n+3) is opposed to the surface 10S(2n+3). The head 15-(2n+3) writes data on the surface 10S(2n+3) and reads data from the surface 10S(2n+3). The head 15-(2n+4) is opposed to the surface 10S(2n+4). The head 15-(2n+4) writes data on the surface 10S(2n+4) and reads data from the surface 10S(2n+4).

In the example shown in FIG. 5, the head amplifier IC 301 is electrically connected to the heads 15-(2m−4) to 15-(2m+4). The head amplifier IC 301 is electrically connected to the R/W channel 40 and HDC 50.

In the example shown in FIG. 5, the head amplifier IC 302 is electrically connected to the heads 15-(2n−4) to 15-(2n+4). The head amplifier IC 302 is electrically connected to the R/W channel 40 and HDC 50.

The volatile memory 70 is a semiconductor memory in which stored data is lost when the power supply to the memory 70 is shut off. The volatile memory 70 stores therein data or the like necessary for each portion of the magnetic disk device 1. The volatile memory 70 is, for example, a dynamic random access memory (DRAM) or synchronous dynamic random access memory (SDRAM). It should be noted that the volatile memory 70 may be included in the system controller 130 to be described later.

The nonvolatile memory 80 is a semiconductor memory in which stored data is continued to be retained even when the power supply to the memory 90 is shut off. The nonvolatile memory 80 is, for example, a NOR-type or NAND-type flash read only memory (ROM) (FROM). It should be noted that the nonvolatile memory 80 may be included in the system controller 130 to be described later.

The buffer memory 90 is a semiconductor memory configured to temporarily record therein data or the like to be transmitted or received between the magnetic disk device 1 and host 100. It should be noted that the buffer memory 90 may be configured integral with the volatile memory 70. The buffer memory 90 is, for example, a DRAM, static random access memory (SRAM), SDRAM, ferroelectric random access memory (FeRAM), magneto-resistive random access memory (MRAM) or the like. It should be noted that the buffer memory 90 may be included in the system controller 130 to be described later.

The system controller (controller) 130 is realized by using, for example, a large-scale integrated circuit (LSI) called a System-on-a-Chip (SoC) formed by integrating a plurality of elements into a single chip. The system controller 130 includes a read/write (R/W) channel 40, hard disk controller (HDC) 50, and microprocessor (MPU) 60. The R/W channel 40, HDC 50, and MPU 60 are electrically connected to each other. The system controller 130 is electrically connected to, for example, the driver IC 20, head amplifier IC 30, volatile memory 70, nonvolatile memory 80, buffer memory 90, host 100, and the like.

The R/W channel 40 executes signal processing of data to be transferred from the disk 10 to the host 100, for example, read data, and data to be transferred from the host 100, for example, write data according to an instruction from the MPU 60 to be described later. The R/W channel 40 is electrically connected to, for example, the head amplifier IC 30, HDC 50, MPU 60, and the like. The R/W channel 40 includes a circuit or function configured to encode write data. Further, the R/W channel 40 includes a circuit or function configured to measure the signal quality of read data, and circuit or function configured to decode read data. The R/W channel 40 is electrically connected to the head amplifier IC 30 and the like.

The HDC 50 controls data transfer between the host 100 and R/W channel 40 according to an instruction from the MPU 60 to be described later. The HDC 50 is electrically connected to, for example, the head amplifier IC 30, R/W channel 40, MPU 60, volatile memory 70, nonvolatile memory 80, buffer memory 90, and the like.

The MPU 60 is a main controller configured to control each portion of the magnetic disk device 1. The MPU 60 controls the VCM 14 through the driver IC 20 to thereby execute servo control of carrying out positioning of the head 15. The MPU 60 controls an operation of write of data to the disk 10 and selects a storage destination of data to be transferred from the host 100, for example, write data. The MPU 60 controls an operation of read of data from the disk 10 and controls processing of data to be transferred from the disk 10 to the host 100, for example, read data. Further, the MPU 60 manages a data recording area. The MPU 60 is connected to each portion of the magnetic disk device 1. The MPU 60 is electrically connected to, for example, the driver IC 20, R/W channel 40, HDC 50, and the like.

The MPU 60 includes a read/write control portion 610, servo pattern control portion 620, cylinder offset amount measuring portion 630, spiral copy control portion 640, and positioning control portion 650. The MPU 60 executes processing of these portions, for example, read/write control portion 610, servo pattern control portion 620, cylinder offset amount measuring portion 630, spiral copy control portion 640, and positioning control portion 650, and the like on the firmware. It should be noted that the MPU 60 may include these portions, for example, the read/write control portion 610, servo pattern control portion 620, cylinder offset amount measuring portion 630, spiral copy control portion 640, positioning control portion 650, and the like as circuits.

The read/write control portion 610 controls read processing and write processing of data according to a command or the like from the host 100. The read/write control portion 610 controls the VCM 14 through the driver IC 20 to thereby arrange the head 15 at a predetermined radial position on the disk 10 and execute read processing or write processing. Hereinafter "write processing" and "read processing" are collectively expressed by the term "access" or "access processing" in some cases.

The servo pattern control portion 620 writes servo patterns on the disk 10. The servo pattern control portion 620 writes spiral servo patterns BSV and product servo patterns PSV on the disk 10.

The servo pattern control portion 620 writes spiral servo patterns BSV on the disk 10. The servo pattern control portion 620 writes spiral servo patterns BSV on the disk 10 in the process (hereinafter referred to as the BDW process in some cases) of blank disk writing (BDW) (or blank disk servo write) of writing spiral servo patterns BSV in sequence on the disk 10 on which absolutely no data and no pattern are written (hereinafter referred to as the blank state in some cases). In the BDW process, the servo pattern control portion 620 cannot read data, patterns or the like from the disk 10 in the blanked state, and hence the servo pattern control portion 620 executes, without executing the read processing (or ontrack), constant-speed control on the head 15 according to the information about the speed of the head 15 (hereinafter referred to as counter-motive speed information in some cases) relative to the disk 10 based on the counter-electromotive voltage occurring from the VCM 14 to thereby write spiral servo patterns BSV on the disk 10 from the inner side in the radial direction, for example, from the innermost circumference IMC toward the outer side, for example, toward the outermost circumference OMC by using a position (hereinafter referred to as a clock reference position in some cases) on the disk 10 corresponding to the reference clock to be generated once per rotation of the disk 10 in the blanked state as the starting position of writing. It should be noted that in the BDW process, the servo pattern control portion 620 may execute constant-speed control on the head 15 according to the counter-motive speed information to thereby write spiral servo patterns BSV on the disk 10 from the outer side in the radial direction, for example, from the outermost circumference OMC toward the inner side, for example, toward the innermost circumference IMC by using a clock reference position of the disk 10 in the blanked state as the starting position of writing. The servo pattern control portion 620 writes spiral servo patterns BSV while accelerating the head 15 until the head 15 reaches a predetermined speed within the range on the disk 10 in the blanked state from the clock reference position which is the starting position of writing to a predetermined position, and writes spiral servo patterns BSV while decelerating the head 15 from the predetermined speed to a predetermined speed within the range on the disk 10 in the blanked state from the predetermined position to the termination position of writing. Hereinafter the state where the head 15 is accelerated until the head 15 reaches the predetermined speed within the range from the starting position to the predetermined position is referred to as the acceleration state, acceleration time, acceleration control or acceleration rate control, state where write is carried out by the head 15 of the constant speed is referred to as the constant-speed state, constant-speed time, constant-speed control or constant-speed rate control and, state where the head 15 is decelerated until the head 15 reaches the predetermined speed within the range from the predetermined position to the termination position is referred to as the deceleration state, deceleration time or deceleration control in some cases. Further, the "speed of the head 15 writing spiral servo patterns at the constant-speed time" is referred to as the "spiral speed" in some cases.

In the BDW process, the servo pattern control portion 620 writes spiral servo patterns (hereinafter referred to as reference spiral servo patterns in some cases) BSV on the surface (hereinafter referred to as the reference surface in some cases) of the disk 10 corresponding to the reference head 15 by at least one (head) (hereinafter referred to as a reference head in some cases) 15 of a plurality of heads 15 of a predetermined spiral speed (hereinafter referred to as a reference spiral speed in some cases).

The servo pattern control portion 620 executes, by each head 15, touchdown measurement on each surface 10S corresponding to each head 15. The touchdown measurement is measurement of a method of applying electric power to the heater element (heater) of the head 15 and thermally expanding the head to thereby protrude part of the head 15 toward the disk 10 and bring the head 15 into contact with the disk 10, and measuring the applied power (controlling value of a clearance (levitation amount of the head 15) between the head 15 and disk 10) at the time when contact of the head 15 with the disk 10 is detected. In, for example, the process (hereinafter referred to as the SSW process or SSW processing in some cases) of self servo write (SSW), the servo pattern control portion 620 executes touchdown measurement on each surface 10S corresponding to each head 15 by each head 15 on the basis of the reference spiral servo patterns. In other words, in, for example, the SSW process, the servo pattern control portion 620 locks the reference head 15 on the reference spiral servo patterns and executes touchdown measurement on each surface 10S corresponding to each head 15 by each head 15.

The servo pattern control portion 620 executes R/W offset measurement by each head 15 to thereby measure an R/W offset amount corresponding to each head 15. In the SSW process, the servo pattern control portion 620 executes R/W offset measurement corresponding to each head 15 on the basis of, for example, the reference spiral servo patterns to thereby measure an R/W offset amount corresponding to each head 15. In other words, in the SSW process, the servo pattern control portion 620 locks the reference head 15 on, for example, the reference spiral servo patterns and executes R/W offset measurement by each head 15 to thereby measure an R/W offset amount corresponding to each head 15.

The servo pattern control portion 620 writes product servo patterns PSV on the disk 10. In the SSW process, the servo pattern control portion 620 writes product servo patterns PSV on the basis of the spiral servo patterns BSV. In the SSW process, the servo pattern control portion 620 writes product servo patterns PSV from the inner side in the radial direction, for example, the innermost circumference IMC toward the outer side, for example, the outermost circumference OMC while correcting the R/W offset amount on the basis of the spiral servo patterns BSV and R/W offset amount. It should be noted that, in the SSW process, the servo pattern control portion 620 may write product servo patterns PSV from the outer side in the radial direction, for example, the outermost circumference OMC toward the inner side, for example, the innermost circumference IMC while correcting the R/W offset amount on the basis of the spiral servo patterns BSV and R/W offset amount.

In the SSW process, the servo pattern control portion 620 writes product servo patterns (hereinafter referred to as reference product servo patterns in some cases) PSV by at least one reference head 15 among the plurality of heads 15 on the reference surface 10S corresponding to the aforementioned reference head 15 while correcting the R/W offset amount on the basis of the reference spiral servo patterns BSV and R/W offset amount corresponding to the reference head 15.

The cylinder offset amount measuring portion 630 measures a cylinder offset amount. The cylinder offset amount measuring portion 630 measures a cylinder offset amount between data written by one (head) (hereinafter referred to as a cylinder offset reference head in some cases) 15 of a plurality of heads 15, e.g., a track or sector, and data written by a head (hereinafter referred to as a cylinder offset object head in some cases) 15 different from the cylinder offset reference head 15, e.g., a track or sector. It should be noted that the cylinder offset amount measuring portion 630 may measure a cylinder offset amount between one (head) (hereinafter referred to as the cylinder offset reference head in some cases) 15 of a plurality of heads 15 and head (hereinafter referred to as the cylinder offset object head in some cases) 15 different from the cylinder offset reference head 15. The cylinder offset amount measuring portion 630 records the measured cylinder offset amount in a predetermined recording area, e.g., the volatile memory 70, non-volatile memory 80, buffer memory 90 or the like in association with the head 15 corresponding to the cylinder offset amount, e.g., the cylinder offset object head 15.

For example, the cylinder offset amount measuring portion 630 measures a cylinder offset amount corresponding to each head 15 by using a predetermined head 15 of the plurality of heads 15 as a criterion by means of the head disk interface (HDI) RampCal. The cylinder offset amount measuring portion 630 records each of the cylinder offset amounts measured by using the predetermined head 15 among the plurality of heads 15 as a criterion in a predetermined recording area, e.g., the volatile memory 70, buffer memory 90 or the like for each head.

For example, the cylinder offset amount measuring portion 630 measures a cylinder offset amount corresponding to each head 15 by using a predetermined head 15 among the plurality of heads 15 as a criterion by means of the head disk interface (HDI) RampCal for each zone. The cylinder offset amount measuring portion 630 records each of the cylinder offset amounts measured by using the predetermined head 15 among the plurality of heads 15 as a criterion in a predetermined recording area, e.g., the volatile memory 70, buffer memory 90 or the like for each head and for each zone.

The spiral copy control portion 640 writes spiral servo patterns (hereinafter referred to as copy spiral servo patterns in some cases) BSV on each surface (hereinafter referred to as a spiral copy surface in some cases) 10S different from the reference surface 10S by each head (hereinafter referred to as a spiral copy head in some cases) 15 different from the reference head 15 on the basis of the reference spiral servo patterns BSV. In other words, the spiral copy control portion 640 copies the reference spiral servo patterns BSV to each spiral copy surface 10S by each spiral copy head 15 on the basis of the reference spiral servo patterns BSV. The spiral copy control portion 640 writes the copy spiral servo patterns BSV on the spiral copy surface 10S by the spiral copy head 15 on the basis of the reference spiral servo patterns BSV accessed by the reference head 15. In other words, the spiral copy control portion 640 writes the copy spiral servo patterns BSV on the spiral copy surface 10S by the spiral copy head 15 on the basis of the reference head 15. Hereinafter, the expression "copying the reference spiral servo patterns to the spiral copy surface 10S" is referred to as "spiral copying" in some cases.

The spiral copy control portion 640 executes spiral copying on each spiral copy surface 10S by each spiral copy head 15 on the basis of a cylinder offset amount corresponding to each spiral copy head 15.

For example, the spiral copy control portion 640 adjusts each spiral speed (hereinafter referred to as a copy spiral speed in some cases) corresponding to each spiral copy head 15 according to a cylinder offset amount corresponding to each spiral copy head 15, and executes spiral copying on each spiral copy surface 10S by each spiral copy head 15 of each adjusted spiral speed (hereinafter referred to as an adjusted copy spiral speed in some cases). For example, the spiral copy control portion 640 adjusts each copy spiral speed corresponding to each spiral copy head 15 to each adjusted copy spiral speed in such a manner that each cylinder offset amount corresponding to each spiral copy head 15 becomes smaller, and executes spiral copying on each spiral copy surface 10S by each spiral copy head 15 of each adjusted copy spiral speed.

For example, the spiral copy control portion 640 adjusts each copy spiral speed in each zone corresponding to each spiral copy head 15 according to a cylinder offset amount in each zone corresponding to each spiral copy head 15, and executes spiral copying on each spiral copy surface 10S by each spiral copy head 15 of each adjusted spiral speed (hereinafter referred to as an adjusted copy spiral speed in some cases) in each zone. For example, the spiral copy control portion 640 adjusts each copy spiral speed in each zone corresponding to each spiral copy head 15 to each adjusted copy spiral speed in such a manner that each cylinder offset amount in each zone corresponding to each spiral copy head 15 becomes smaller, and executes spiral copying on each spiral copy surface 10S by each spiral copy head 15 of each adjusted copy spiral speed in each zone.

By adjusting the spiral speed of the spiral copy head 15 to the adjusted copy spiral speed, it is possible to change the skew of the copy spiral servo patterns BSV on the spiral copy surface 10S corresponding to the spiral copy head 15. By writing product servo patterns (hereinafter referred to as copy product servo patterns in some cases) PSV on the spiral copy surface 10S on the basis of the copy spiral servo patterns (hereinafter referred to as adjusted copy spiral servo patterns in some cases) written on the spiral copy surface 10S by the spiral copy head 15 of the adjusted copy spiral speed, it is possible to adjust the positional difference (cylinder offset amount) between the reference product servo patterns PSV written on the basis of the reference spiral servo patterns BSV and copy product servo patterns PSV. For example, by adjusting the copy spiral speed to the adjusted copy spiral speed greater than the reference spiral speed, the skew of the copy spiral servo patterns BSV spreads relatively to the skew of the reference spiral servo patterns BSV. For example, by adjusting the copy spiral speed to the adjusted copy spiral speed less than the reference spiral speed, the skew of copy spiral servo patterns BSV becomes less relatively to the skew of the reference spiral servo patterns BSV.

The positioning control portion 650 executes positioning control of the head 15. The positioning control portion 650 executes positioning control of the head 15 on the basis of the spiral servo patterns BSV and product servo patterns PSV.

FIG. 6 is a schematic view showing an example of a correspondence relationship between the reference head 15 and spiral copy heads 15. In Table TB of FIG. 6, head numbers, reference surfaces, and spiral copy surfaces are shown. In Table TB of FIG. 6, the heads 15-($2m-4$) to 15-($2m+4$) and heads 15-($2n-4$) to 15-($2n+4$) are shown. Table TB may be saved in a predetermined recording area, for example, the system area 10b of the disk 10, volatile memory 70, nonvolatile memory 80 or buffer memory 90.

In the example shown in FIG. 6, the MPU 60 sets, in, for example, Table TB, the head 15-($2m$) and head 15-($2n$) as the reference heads. The MPU 60 sets the heads 15-($2m-4$), 15-($2m-3$), 15-($2m-2$), 15-($2m-1$), 15-($2m+1$), 15-($2m+2$), 15-($2m+3$), 15-($2m+4$), 15-($2n-4$), 15-($2n-3$), 15-($2n-2$), 15-($2n-1$), 15-($2n+1$), 15-($2n+2$), 15-($2n+3$), and 15-($2n+4$) as the spiral copy heads.

The MPU 60 writes reference spiral servo patterns on the reference surface 10S($2m$) by the reference head 15-($2m$). The MPU 60 writes reference spiral servo patterns on the reference surface 10S($2n$) by the reference head 15-($2n$).

On the basis of the reference head 15-($2n$), the MPU 60 executes spiral copying on each of the spiral copy surfaces 10S($2m-4$), 10S($2m-3$), 10S($2m-2$), 10S($2m-1$), 10S($2m+1$), 10S($2m+2$), 10S($2m+3$), and 10S($2m+4$) by each of the spiral copy heads 15-($2m-4$), 15-($2m-3$), 15-($2m-2$), 15-($2m-1$), 15-($2m+1$), 15-($2m+2$), 15-($2m+3$), and 15-($2m+4$). On the basis of the reference head 15-($2n$), and according to each cylinder offset amount corresponding to each of the spiral copy heads 15-($2m-4$) to 15-($2m+4$), the MPU 60 executes spiral copying on each of the spiral copy surfaces 10S($2m-4$), 10S($2m-3$), 10S($2m-2$), 10S($2m-1$), 10S($2m+1$), 10S($2m+2$), 10S($2m+3$), and 10S($2m+4$) on a one-by-one basis by each of the spiral copy heads 15-($2m-4$), 15-($2m-3$), 15-($2m-2$), 15-($2m-1$), 15-($2m+1$), 15-($2m+2$), 15-($2m+3$), and 15-($2m+4$).

On the basis of the reference head 15-($2m$), the MPU 60 executes spiral copying on each of the spiral copy surfaces 10S($2n-4$), 10S($2n-3$), 10S($2n-2$), 10S($2n-1$), 10S($2n+1$), 10S($2n+2$), 10S($2n+3$), and 10S($2n+4$) by each of the spiral copy heads 15-($2n-4$), 15-($2n-3$), 15-($2n-2$), 15-($2n-1$), 15-($2n+1$), 15-($2n+2$), 15-($2n+3$), and 15-($2n+4$). On the basis of the reference head 15-($2m$), and according to each cylinder offset amount corresponding to each of the spiral copy heads 15-($2n-4$) to 15-($2n+4$), the MPU 60 executes spiral copying on each of the spiral copy surfaces 10S($2n-4$), 10S($2n-3$), 10S($2n-2$), 10S($2n-1$), 10S($2n+1$), 10S($2n+2$), 10S($2n+3$), and 10S($2n+4$) on a one-to-one basis by each of the spiral copy heads 15-($2n-4$), 15-($2n-3$), 15-($2n-2$), 15-($2n-1$), 15-($2n+1$), 15-($2n+2$), 15-($2n+3$), and 15-($2n+4$).

When spiral copying is executed by a head 15 close to the reference head 15, an influence of crosstalk is exerted when spiral servo patterns are written, and hence there is a possibility of noise occurring to the aforementioned spiral servo patterns. Accordingly, as in the case of the example shown in FIG. 6, the MPU 60 sets each of a plurality of heads 15 separate from the reference head 15 by a predetermined distance, for example, by a predetermined distance in the height direction Z as a spiral copy head 15.

Figure 7:
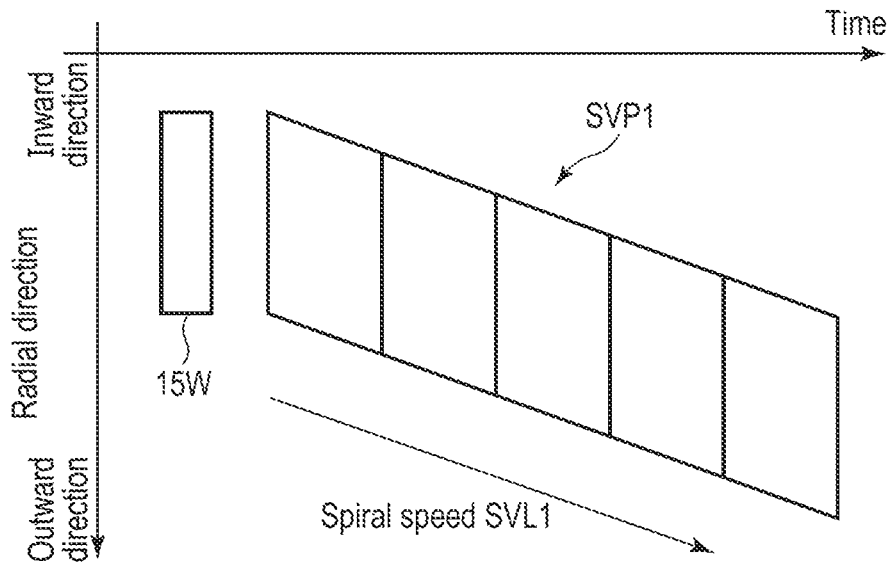
FIG. 7 is a schematic view showing an example of a reference spiral servo pattern.

FIG. 7 is a schematic view showing an example of a reference spiral servo pattern SVP1. In FIG. 7, the axis of abscissas indicates the time and axis of ordinate indicates the radial direction. On the axis of ordinate in FIG. 7, with the movement toward the tip end side of the arrow, advancement in the direction to the outer side is promoted, and with the movement toward the opposite side of the tip end side of the arrow, advancement in the direction to the inner side is promoted. On the axis of abscissas in FIG. 7, with the movement toward the tip end side of the arrow, the longer time elapses.

In the example shown in FIG. 7, the MPU 60 writes the reference spiral servo pattern SVP1 on the reference surface 10S by the write head 15W of the reference head 15 at the reference spiral speed SVL1.

Figure 8:
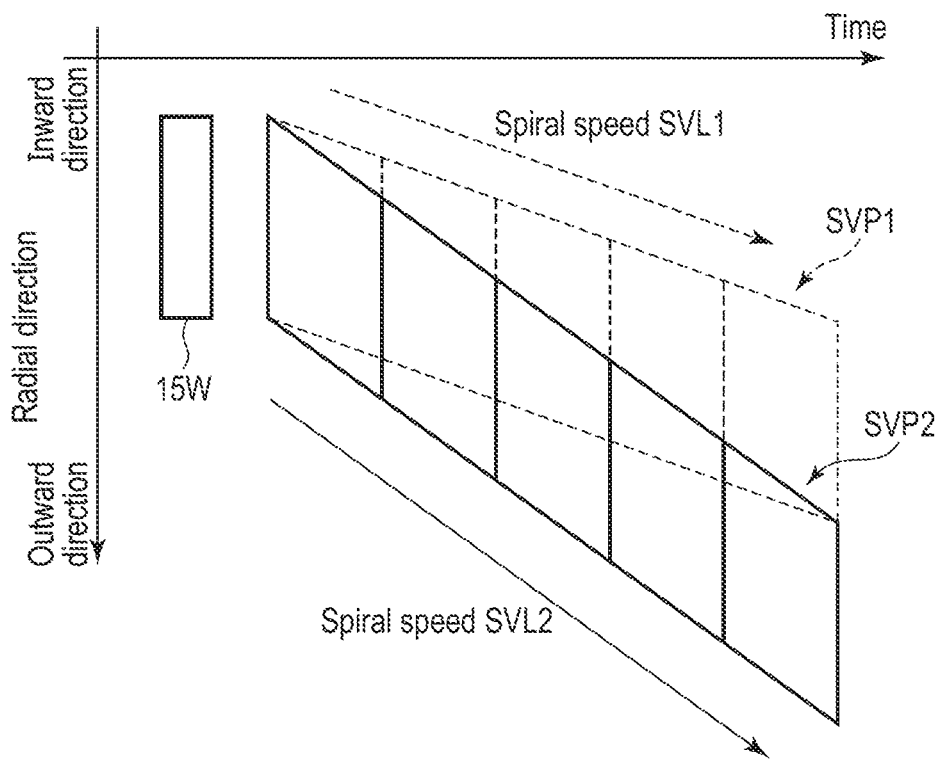
FIG. 8 is a schematic view showing an example of a copy spiral servo pattern.

FIG. 8 is a schematic view showing an example of a copy spiral servo pattern SVP2. In FIG. 8, the axis of abscissas indicates the time and axis of ordinate indicates the radial direction. On the axis of ordinate in FIG. 8, with the movement toward the tip end side of the arrow, advancement in the direction to the outer side is promoted, and with the movement toward the opposite side of the tip end side of the arrow, advancement in the direction to the inner side is promoted. On the axis of abscissas in FIG. 8, with the movement toward the tip end side of the arrow, the longer time elapses. The adjusted copy spiral speed SVL2 is greater than the reference spiral speed SVL1.

In the example shown in FIG. 8, the MPU 60 adjusts the speed from the reference spiral speed SVL1 to the adjusted copy spiral speed SVL2, and writes the copy spiral servo pattern SVP2 on the spiral copy surface 10S by the write head 15W of the spiral copy head 15 at the adjusted copy spiral speed SVL2. The copy spiral servo pattern SVP2 is ahead of the reference spiral servo pattern SVP1 in the outward direction at the predetermined time.

Figure 9:
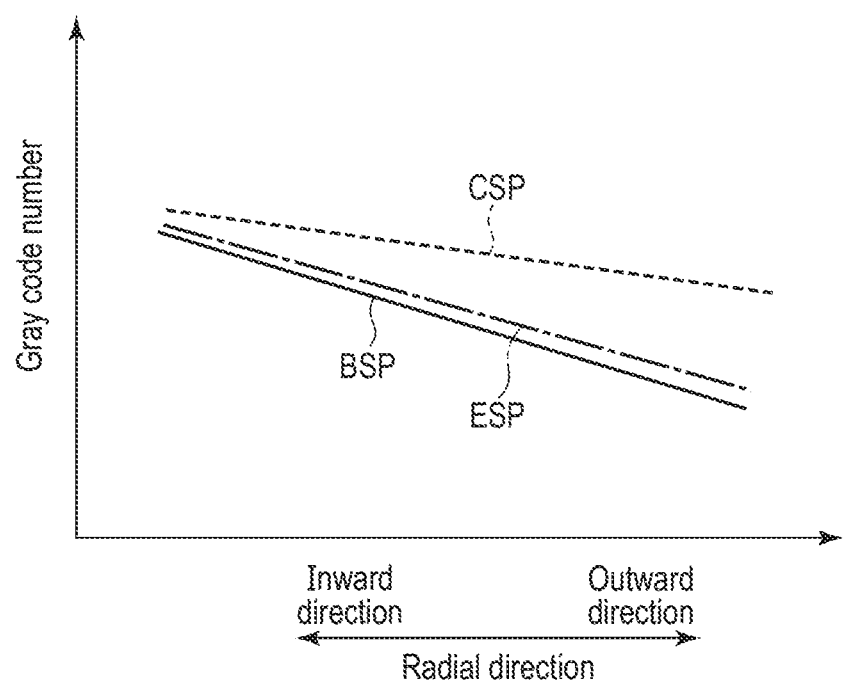
FIG. 9 is a schematic view showing an example of changes in the Gray code number relative to the radial positions.

FIG. 9 is a schematic view showing an example of changes in the Gray code number relative to the radial positions. In FIG. 9, the axis of abscissas indicates the radial position and axis of ordinate indicates the Gray code number. On the axis of ordinate in FIG. 9, the Gray code number becomes greater toward the tip end side of the arrow and becomes less toward the opposite side of the tip end side of the arrow. On the axis of abscissas in FIG. 9, the radial position advances toward the tip end side of the arrow to advance in the direction to the outer side, and advances toward the opposite side of the tip end side of the arrow to advance in the direction to the inner side. In FIG. 9, changes in the Gray code number (hereinafter referred to as changes in the Gray code number corresponding to the reference spiral servo pattern BSV in some cases) ESP relative to the radial positions corresponding to the reference spiral servo pattern BSV, changes in the Gray code number (hereinafter referred to as changes in the Gray code number corresponding to the comparative copy spiral servo pattern in some cases) CSP corresponding to the copy spiral servo pattern (hereinafter referred to as the comparative copy spiral servo pattern in some cases) written by a spiral copy head 15 of a copy spiral speed corresponding to the reference spiral speed, and changes in the Gray code number (hereinafter referred to as changes in the Gray code number corresponding to the adjusted copy spiral servo pattern in some cases) BSP corresponding to the adjusted copy spiral servo pattern written by a spiral copy head 15 of the adjusted copy spiral speed are shown.

As shown in FIG. 9, the difference between the changes ESP in the Gray code number corresponding to the reference spiral servo pattern BSV and changes CSP in the Gray code number corresponding to the comparative copy spiral servo pattern becomes greater in the direction toward the outer side. For this reason, the comparative copy spiral servo pattern can possibly deviate from tie reference spiral servo pattern BSV. Accordingly, in the planar view, the cylinder offset amount between the reference spiral servo pattern BSV and comparative copy spiral servo pattern can become greater.

As shown in FIG. 9, the difference between the changes ESP in the Gray code number corresponding to the reference spiral servo pattern BSV and changes BSP in the Gray code number corresponding to the adjusted copy spiral servo pattern BSV is approximately constant at radial positions (in the radial direction). The changes ESP in the Gray code number corresponding to the reference spiral servo pattern BSV and changes BSP in the Gray code number BSP corresponding to the adjusted copy spiral servo pattern BSV are approximately coincident with each other. Accordingly, the reference spiral servo pattern BSV and adjusted copy spiral servo pattern BSV are approximately coincident with each other. In the planar view, the reference spiral servo pattern BSV and adjusted copy spiral servo pattern BSV are approximately coincident with each other.

Figure 10:
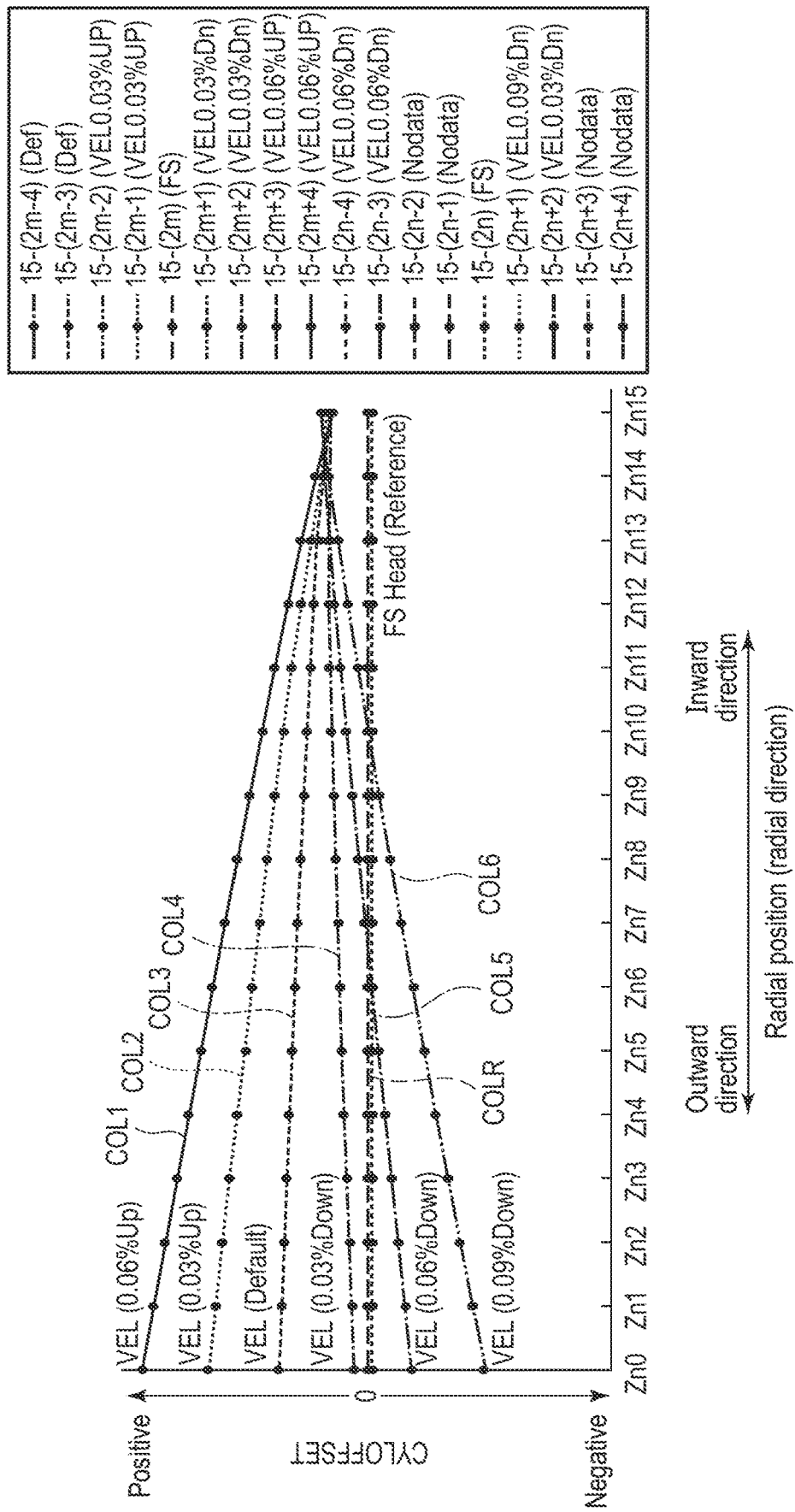
FIG. 10 is a schematic view showing an example of changes in the cylinder offset amount relative to the radial positions compared with the reference head according to the embodiment.

FIG. 10 is a schematic view showing an example of changes in the cylinder offset amount relative to the radial positions compared with the reference head 15 according to the embodiment. In FIG. 10, the axis of abscissas indicates radial positions (radial direction and axis of ordinate indicates cylinder offset amounts. On the axis of ordinate of FIG. 10, the cylinder offset amount becomes greater toward the tip end side of the positive arrow in the positive value thereof, and becomes less toward the tip end side of the negative arrow in the negative value thereof. On the axis of abscissas of FIG. 10, the radial position (radial direction) advances in the direction to the outer side with approach thereof to the tip end side of the outward arrow, and advances in the direction to the inner side with approach thereof to the tip end side of the inward arrow. In FIG. 10, changes COLR in the cylinder offset amount relative to the radial positions (radial direction) corresponding to the reference head 15-(2m) and head 15-(2n) are shown. Hereinafter the expression "changes in the cylinder offset amount relative to the radial positions (radial direction)" is referred to simply as "changes in the cylinder offset amount" in some cases. In FIG. 10, changes COL1 in the cylinder offset amount corresponding to the spiral copy head 15 of an adjusted copy spiral speed made greater than the reference spiral speed by 0.06%, changes COL2 in the cylinder offset amount corresponding to the spiral copy head 15 of an adjusted copy spiral speed made greater than the reference spiral speed by 0.03%, changes COL3 in the cylinder offset amount corresponding to the spiral copy head 15 of the reference spiral speed, changes COL4 in the cylinder offset amount corresponding to the spiral copy head 15 of an adjusted copy spiral speed made less than the reference spiral speed by 0.03%, changes COL5 in the cylinder offset amount corresponding to the spiral copy head 15 of an adjusted copy spiral speed made less than the reference spiral speed by 0.06%, and changes COL6 in the cylinder offset amount corresponding to the spiral copy head 15 of an adjusted copy spiral speed made less than the reference spiral speed by 0.09% are shown. It should be noted that an error which can unintentionally and naturally occur in the spiral speed due to the structure or system is of an order of one hundredth of the order shown in FIG. 10, and hence it is possible to discriminate between the error which can naturally occur and which occurs in the spiral speed and amount of a change in the adjusted spiral speed shown in FIG. 10.

In FIG. 10, the spiral copy heads 15-(2m−4) and 15-(2m−3) correspond to the changes COL3 in the cylinder offset amount corresponding to the spiral copy head 15 of the reference spiral speed. The spiral copy heads 15-(2m−2) and 15-(2m−1) correspond to the changes COL2 in the cylinder offset amount corresponding to the spiral copy head 15 of the adjusted copy spiral speed made greater than the reference spiral speed by 0.03%. The spiral copy heads 15-(2m+1) and 15-(2m+2) correspond to the changes COL4 in the cylinder offset amount corresponding to the spiral copy head 15 of the adjusted copy spiral speed made less than the reference spiral speed by 0.03%. The spiral copy heads 15-(2m+3) and 15-(2m+4) correspond to the changes COL1 in the cylinder offset amount corresponding to the spiral copy head 15 of the adjusted copy spiral speed made greater than the reference spiral speed by 0.06%. The spiral copy heads 15-(2n−4) and 15-(2n−3) correspond to the changes COL5 in the cylinder offset amount corresponding to the spiral copy head 15 of the adjusted copy spiral speed made less than the reference spiral speed by 0.06%. The spiral copy heads 15-(2n−2) and 15-(2n−1) have no data. The spiral copy head 15-(2n+1) corresponds to the changes COL6 in the cylinder offset amount corresponding to the spiral copy head 15 of the adjusted copy spiral speed made less than the reference spiral speed by 0.09%. The spiral copy heads 15-(2n+2) corresponds to the changes COL4 in the cylinder offset amount corresponding to the spiral copy head 15 of the adjusted copy spiral speed made less than the reference spiral speed by 0.03%. The spiral copy heads 15-(2n+3) and 15-(2n+4) have no data.

In the example shown in FIG. 10, the changes COL4 in the cylinder offset amount corresponding to the spiral copy head 15 of the adjusted copy spiral speed made less than the reference spiral speed by 0.03%, and changes COL5 in the cylinder offset amount corresponding to the spiral copy head 15 of the adjusted copy spiral speed made less than the reference spiral speed by 0.06% are approximate to the changes COLR in the cylinder offset amount relative to the radial positions (radial direction) corresponding to the reference head 15-(2m) and head 15-(2n). The copy spiral servo pattern written by the spiral copy head 15 of the adjusted copy spiral speed made less than the reference spiral speed by 0.03% is approximately identical to the reference spiral servo pattern. Further, the copy spiral servo pattern written by the spiral copy head 15 of the adjusted copy spiral speed made less than the reference spiral speed by 0.06% is approximately identical to the reference spiral servo pattern. The terms "identical", "identity", "coincidence", and "equality" have the meaning "exactly the same" as a matter of course, and also have the meaning "different to such a degree that it is possible to regard as being substantially the same". In the example shown in FIG. 10, the copy spiral servo pattern written by the spiral copy head 15 of the adjusted copy spiral speed made less than the reference spiral speed by 0.03% to 0.06% is approximately identical to the reference spiral servo pattern. In the example shown in FIG. 10, the copy spiral servo pattern written by the spiral copy head 15 of the adjusted copy spiral speed made less than the reference spiral speed by 0.04% to 0.05% can be most approximate to the reference spiral servo pattern.

FIG. 11 is a schematic view showing an example of changes in the cylinder offset amount relative to the radial positions compared with a predetermined head according to the embodiment. In FIG. 11, the axis of abscissas indicates radial positions (radial direction), and axis of ordinate indicates cylinder offset amounts. On the axis of ordinate of FIG. 11, the cylinder offset amount becomes greater toward the tip end side of the positive arrow in the positive value thereof, and becomes less toward the tip end side of the negative arrow in the negative value thereof. On the axis of abscissas of FIG. 11, the radial position (radial direction) advances in the direction to the outer side with approach thereof to the tip end side of the outward arrow, and advances in the direction to the inner side with approach thereof to the tip end side of the inward arrow. In FIG. 11, an aggregate of changes COVL in the cylinder offset amount corresponding to the spiral copy heads 15-(2m–4) to 15-(2n+4) of the adjusted copy spiral speeds relative to the spiral copy head 15 of the reference spiral speed is shown.

In the example shown in FIG. 11, in the aggregate of changes COVL in the cylinder offset amount corresponding to the spiral copy heads 15-(2m–4) to 15-(2n+4) of the adjusted copy spiral speeds relative to the spiral copy head 15 of the reference spiral speed, the changes in the cylinder offset amount are approximately identical to each other. Accordingly, the plurality of spiral servo patterns relating to the aggregate of changes COVL in the cylinder offset amount corresponding to the spiral copy heads 15-(2m–4) to 15-(2n+4) of the adjusted copy spiral speeds relative to the spiral copy head 15 of the reference spiral speed are approximately coincident with each other.

Figure 12:
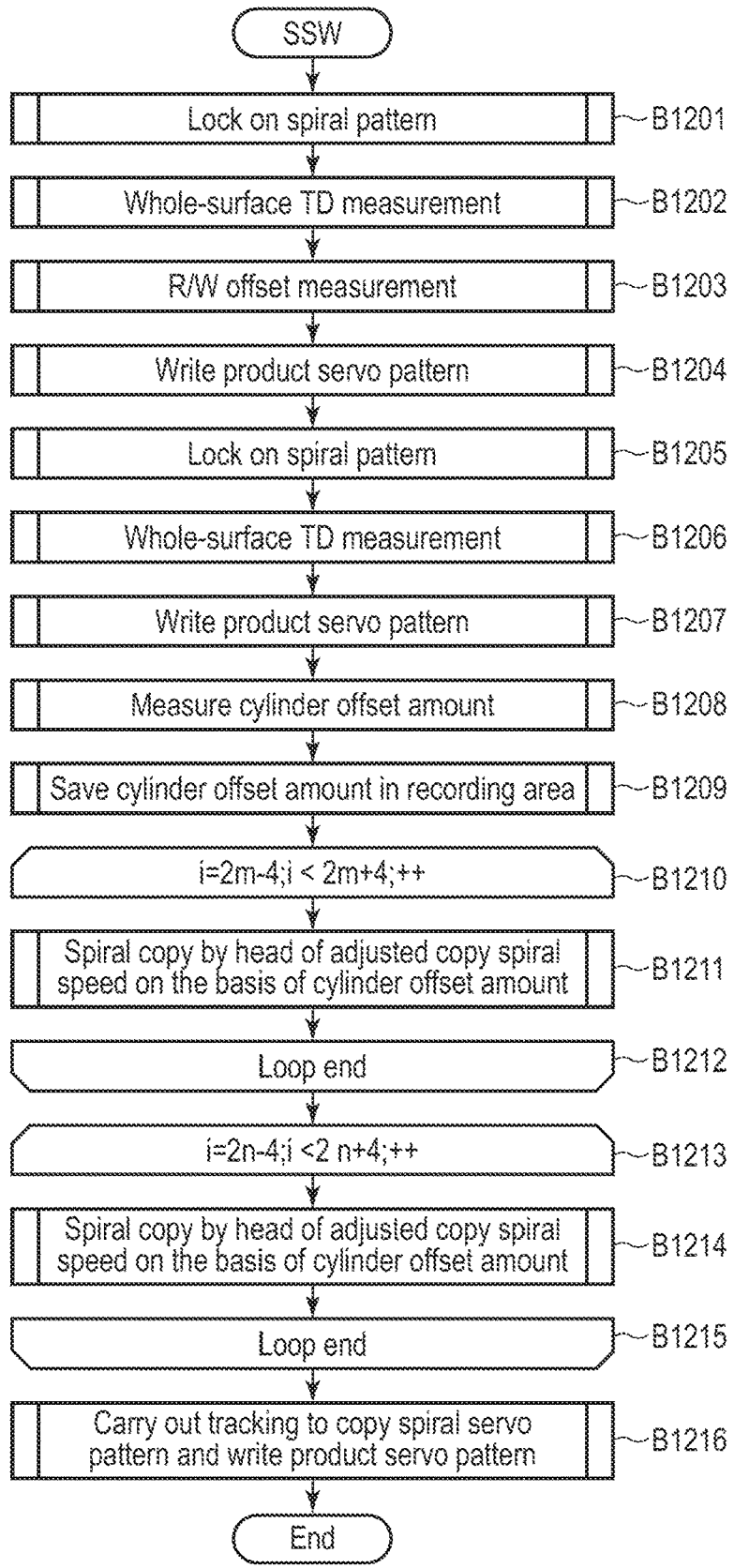
FIG. 12 is a schematic view showing an example of SSW processing according to the embodiment.

FIG. 12 is a schematic view showing an example of SSW processing according to the embodiment.

The MPU 60 locks the reference head 15-(2m) on the reference spiral servo pattern written by the reference head 15-(2m) (B1201), and executes whole-surface touchdown (TD) measurement by the plurality of heads 15-(2m–4) to 15-(2n+4) (B1202). The MPU 60 executes R/W offset measurement on the whole surface of the disk 10 by the plurality of heads 15-(2m–4) to 15-(2n+4) (B1203), and writes product servo patterns on the reference surface 10S corresponding to the reference head 15-(2m) by the reference head 15-(2m) on the basis of the reference spiral servo pattern BSV written by the reference head 15-(2m) (B1204).

The MPU 60 locks the reference head 15-(2n) on the reference spiral servo pattern written by the reference head 15-(2n) (B1205), and executes whole-surface touchdown (TD) measurement by the plurality of heads 15-(2m–4) to 15-(2n+4) (B1206). The MPU 60 writes product servo patterns on the reference surface 10S corresponding to the reference head 15-(2n) by the reference head 15-(2n) on the basis of the reference spiral servo pattern BSV written by the reference head 15-(2n) (B1207).

The MPU 60 measures cylinder offset amounts corresponding to the heads 15-(2m–4) to 15-(2n+4) by using the predetermined head 15 among the plurality of heads 15-(2m–4) to 15-(2n+4) (B1208). The MPU 60 saves the measured cylinder offset amounts in the predetermined recording area, such as the system area 10b of the disk 10, volatile memory 70, nonvolatile memory 80 or buffer memory 90 (B1209).

The MPU 60 writes or copies a plurality of copy spiral servo patterns on or to the plurality of spiral copy surfaces 10S(2m–4) to 10S(2m–1), and 10S(2m+1) to 10S(2m+4) by the plurality of spiral copy heads 15-(2m–4) to 15-(2m–1), and 15-(2m+1) to 15-(2m+4) of the plurality of adjusted copy spiral speeds on the basis of the plurality of cylinder offset amounts respectively corresponding to the plurality of spiral copy heads 15-(2m–4) to 15-(2m–1), and 15-(2m+1) to 15-(2m+4) according to the reference spiral servo pattern written by the reference head 15-(2n) (B1210, B1211, and B1212).

The MPU 60 writes or copies a plurality of copy spiral servo patterns on or to the plurality of spiral copy surfaces 10S(2n–4) to 10S(2n–1), and 10S(2n+1) to 10S(2n+4) by the plurality of spiral copy heads 15-(2n–4) to 15-(2n–1), and 15-(2n+1) to 15-(2n+4) of the plurality of adjusted copy spiral speeds on the basis of the plurality of cylinder offset amounts respectively corresponding to the plurality of spiral copy heads 15-(2n–4) to 15-(2n–1), and 15-(2n+1) to 15-(2n+4) according to the reference spiral servo pattern written by the reference head 15-(2m) (B1213, B1214, and B1215).

The MPU 60 carries out tracking to each of the copy spiral servo patterns by each of the spiral copy heads 15-(2m–4) to 15-(2m–1), 15-(2m+1) to 15-(2m+4), 15-(2n–4) to 15-(2n–1), and 15-(2n+1) to 15-(2n+4), and writes product servo patterns on each of the spiral copy surfaces 10S(2m–4) to 10S(2m–1), 10S(2m+1) to 10S(2m+4), 10S(2n–4) to 10S(2n–1), and 10S(2n+1) to 10S(2n+4) by each of the spiral copy heads 15-(2m–4) to 15-(2m–1), 15-(2m+1) to 15-(2m+4), 15-(2n–4) to 15-(2n–1), and 15-(2n+1) to 15-(2n+4) (B1216), and then terminates the processing.

According to this embodiment, the magnetic disk device 1 locks the reference head 15 on the reference spiral servo patterns written by the reference head 15, and executes the whole-surface touchdown measurement by the plurality of heads 15. The magnetic disk device 1 executes the R/W offset measurement on the whole surface of the disk by the plurality of heads 15, and writes the product servo patterns on the reference surface 10S corresponding to the reference head 15 by the reference head 15 on the basis of the reference spiral servo patterns BSV written by the reference head 15. The magnetic disk device 1 measures the cylinder offset amount corresponding to each head 15 by using the predetermined head 15 among the plurality of heads 15 as the criterion. The magnetic disk device 1 saves the measured cylinder offset amounts in the predetermined recording area, such as the system area 10b of the disk 10, volatile memory 70, nonvolatile memory 80 or buffer memory 90. The magnetic disk device 1 writes or copies the plurality of copy spiral servo patterns on or to the plurality of spiral copy surfaces 10S by the plurality of spiral copy heads 15 of the plurality of adjusted copy spiral speeds on the basis of the plurality of cylinder offset amounts respectively corresponding to the plurality of spiral copy heads 15 according to the reference spiral servo patterns written by the reference head 15. The magnetic disk device 1 writes the product servo patterns on the spiral copy surfaces 10S by the spiral copy heads 15 on the basis of the copy spiral servo patterns. The magnetic disk device 1 adjusts the spiral speed of each spiral copy head 15 in such a manner as to minimize each cylinder offset amount corresponding to each spiral copy head 15. Accordingly, it is possible for the magnetic disk device 1 to enhance the performance. Accordingly it is possible for the magnetic disk device 1 to enhance the reliability.

Next, a magnetic disk device according to a modified example of the embodiment will be described. In the modified example, portions identical to the above-described embodiment are denoted by reference symbols identical to the embodiment and detailed descriptions of the portions are omitted.

Modified Example 1

A magnetic disk device 1 according to a modified example 1 differs from the magnetic disk device 1 of the above-described embodiment in that the magnetic disk device 1 of the modified example 1 includes a plurality of cylinder offset amounts respectively corresponding to a plurality of heads 15 in a plurality of magnetic disk devices.

An MPU 60 records an average value (hereinafter referred to as a cylinder offset average value in some cases) of a plurality of cylinder offset amounts respectively corresponding to a plurality of heads 15 from a plurality of magnetic disk devices in a predetermined recording area such as a system area 10b of a disk 10, volatile memory 70, nonvolatile memory 80 or buffer memory 90. It should be noted that the MPU 60 may calculate a plurality of cylinder offset average values respectively corresponding to a plurality of heads 15 from a plurality of cylinder offset amounts respectively corresponding to a plurality of heads 15 from a plurality of magnetic disk devices, and may record the plurality of calculated cylinder offset average values in a predetermined recording area such as a system area 10b of a disk 10, volatile memory 70, nonvolatile memory 80 or buffer memory 90.

The MPU 60 reads or refers to the plurality of cylinder offset average values respectively corresponding to the plurality of spiral copy heads 15 recorded in the predetermined recording area. The MPU 60 writes or copies copy spiral servo patterns on or to the spiral copy surfaces 10S by the spiral copy heads 15 of adjusted copy spiral speeds on the basis of the read or referred cylinder offset average values corresponding to the spiral copy heads 15.

For example, the MPU 60 writes or copies copy spiral servo patterns on or to the spiral copy surfaces 10S by the spiral copy heads 15 of adjusted copy spiral speed adjusted in such a manner that the cylinder offset average values corresponding to the spiral copy heads 15 become less.

When mechanical variations in the plurality of magnetic disk devices are small, it is also assumed that variations in the cylinder offset amounts of the magnetic disk devices also become small. Accordingly, a deviation of each copy spiral servo pattern written by each spiral copy head 15 of each adjusted copy spiral speed on the basis of each cylinder offset average value corresponding to each spiral copy head 15 from the reference spiral servo pattern can become small.

FIG. 13 is a schematic view showing an example of SSW processing according to the modified example 1.

The MPU 60 locks the reference head 15-($2m$) on the reference spiral servo pattern written by the reference head 15-($2m$) (B1201), and executes whole-surface touchdown (TD) measurement by the plurality of heads 15-($2m-4$) to 15-($2n+4$) (B1202). The MPU 60 executes R/W offset measurement on the whole surface of the disk 10 by the plurality of heads 15-($2m-4$) to 15-($2n+4$) (B1203), and writes the product servo patterns on the reference surface 10S corresponding to the reference head 15-($2m$) by the reference head 15-($2m$) on the basis of the reference spiral servo patterns BSV written by the reference head 15-($2m$) (B1204).

The MPU 60 locks the reference head 15-($2n$) on the reference spiral servo patterns written by the reference head 15-($2n$) (B1205), and executes whole-surface touchdown (TD) measurement by the plurality of heads 15-($2m-4$) to 15-($2n+4$) (B1206). The MPU 60 writes the product servo patterns on the reference surface 10S corresponding to the reference head 15-($2n$) by the reference head 15-($2n$) on the basis of the reference spiral servo patterns BSV written by the reference head 15-($2n$) (B1207).

The MPU 60 reads each cylinder offset average value corresponding to each spiral copy head 15 from the predetermined recording area such as the system area 10b of the disk 10, volatile memory 70, nonvolatile memory 80 or buffer memory 90 (B1301).

The MPU 60 writes or copies a plurality of copy spiral servo patterns respectively on or to the plurality of spiral copy surfaces 10S($2m-4$) to 10S($2m-1$), and 10S($2m+1$) to 10S($2m+4$) by the plurality of spiral copy heads 15-($2m-4$) to 15-($2m-1$), and 15-($2m+1$) to 15-($2m+4$) of the plurality of adjusted copy spiral speeds on the basis of the plurality of cylinder offset average values respectively corresponding to the plurality of spiral copy heads 15-($2m-4$) to 15-($2m-1$), and 15-($2m+1$) to 15-($2m+4$) according to the reference spiral servo patterns written by the reference head 15-($2n$) (B1302, B1303, and B1304).

The MPU 60 writes or copies a plurality of copy spiral servo patterns on or to the plurality of spiral copy surfaces 10S($2n-4$) to 10S($2n-1$), and 10S($2n+1$) to 10S($2n+4$) by the plurality of spiral copy heads 15-($2n-4$) to 15-($2n-1$), and 15-($2n+1$) to 15-($2n+4$) of the plurality of adjusted copy spiral speeds on the basis of the plurality of cylinder offset average values respectively corresponding to the plurality of spiral copy heads 15-($2n-4$) to 15-($2n-1$), and 15-($2n+1$) to 15-($2n+4$) according to the reference spiral servo patterns written by the reference head 15-($2m$) (B1305, B1306, and B1307).

The MPU 60 carries out tracking to each of the copy spiral servo patterns by each of the spiral copy heads 15-($2m-4$) to 15-($2m-1$), 15-($2m+1$) to 15-($2m+4$), 15-($2n-4$) to 15-($2n-1$), and 15-($2n+1$) to 15-($2n+4$), and writes the product servo patterns on each of the spiral copy surfaces 10S($2m-4$) to 10S($2m-1$), 10S($2m+1$) to 10S($2m+4$), 10S($2n-4$) to 10S($2n-1$), and 10S($2n+1$) to 10S($2n+4$) by each of the spiral copy heads 15-($2m-4$) to 15-($2m-1$), 15-($2m+1$) to 15-($2m+4$), 15-($2n-4$) to 15-($2n-1$), and 15-($2n+1$) to 15-($2n+4$) (B1216), and then terminates the processing.

According to the modified example 1, the magnetic disk device 1 locks the reference head 15 on the reference spiral servo patterns written by the reference head 15, and executes the whole-surface touchdown measurement by the plurality of heads 15. The magnetic disk device 1 executes the R/W offset measurement on the whole surface of the disk by the plurality of heads 15, and writes the product servo patterns on the reference surface 10S corresponding to the reference head 15 by the reference head 15 on the basis of the reference spiral servo patterns BSV written by the reference head 15. The magnetic disk device 1 reads each cylinder offset average value corresponding to each spiral copy head 15 from the predetermined recording area, such as the system area 10*b* of the disk 10, volatile memory 70, non-volatile memory 80 or buffer memory 90. The magnetic disk device 1 writes or copies the plurality of copy spiral servo patterns on or to the plurality of spiral copy surfaces 10S by the plurality of spiral copy heads 15 of the plurality of adjusted copy spiral speeds on the basis of the plurality of cylinder offset average values respectively corresponding to the plurality of spiral copy heads 15 according to the reference spiral servo patterns written by the reference head 15. The magnetic disk device 1 writes the product servo patterns on the spiral copy surfaces 10S by the spiral copy heads 15 on the basis of the copy spiral servo patterns. The magnetic disk device 1 adjusts the spiral speed of each spiral copy head 15 in such a manner as to minimize each cylinder offset average value corresponding to each spiral copy head 15. Accordingly, it is possible for the magnetic disk device 1 to enhance the performance. Accordingly, it is possible for the magnetic disk device 1 to enhance the reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk including a first surface and a second surface different from the first surface;
a first head which carries out read and write of data from and to the first surface;
a second head which carries out read and write of data from and to the second surface; and
a controller which adjusts a spiral speed of at least one of the first head and the second head according to a cylinder offset amount corresponding to a positional difference between the first head and the second head, the spiral speed being a speed at which spiral servo patterns are to be written, wherein
the controller measures the cylinder offset amount and records the measured cylinder offset amount in a recording area.

2. The magnetic disk device of claim 1, wherein
the controller measures the cylinder offset amount for each of zones formed by dividing the disk in the radial direction and adjusts the spiral speed of at least one of the first head and the second head according to the cylinder offset amount for each zone.

3. A magnetic disk device comprising:
a disk including a first surface and a second surface different from the first surface;
a first head which carries out read and write of data from and to the first surface;
a second head which carries out read and write of data from and to the second surface; and
a controller which adjusts a spiral speed of at least one of the first head and the second head according to a cylinder offset amount corresponding to a positional difference between the first head and the second head, the spiral speed being a speed at which spiral servo patterns are to be written, wherein
the controller measures the cylinder offset amount for each of zones formed by dividing the disk in the radial direction and adjusts the spiral speed of at least one of the first head and the second head according to the cylinder offset amount for each zone.

4. A magnetic disk device comprising:
a disk including a first surface and a second surface different from the first surface;
a first head which carries out read and write of data from and to the first surface;
a second head which carries out read and write of data from and to the second surface; and
a controller which adjusts a spiral speed of at least one of the first head and the second head according to a cylinder offset amount corresponding to a positional difference between the first head and the second head, the spiral speed being a speed at which spiral servo patterns are to be written, wherein
the controller writes reference spiral servo patterns which become a criterion on the first surface by the first head of a reference spiral speed which becomes a criterion at the time when the spiral servo patterns are written, locks the first head on the reference spiral servo patterns, and writes the spiral servo patterns on the second surface by the second head of an adjusted spiral speed obtained by adjusting the reference spiral speed.

5. The magnetic disk device of claim 4, wherein
the adjusted spiral speed is less than the reference spiral speed by 0.03% to 0.06%.

6. A magnetic disk device comprising:
a disk including a first surface and a second surface different from the first surface;
a first head which carries out read and write of data from and to the first surface;
a second head which carries out read and write of data from and to the second surface; and
a controller which adjusts a spiral speed of at least one of the first head and the second head according to a cylinder offset amount corresponding to a positional difference between the first head and the second head, the spiral speed being a speed at which spiral servo patterns are to be written, wherein
the controller calculates the cylinder offset amount as an average value of a plurality of positional differences between the first head and the second head.

* * * * *